US007015655B2

(12) United States Patent
Kamoi et al.

(10) Patent No.: US 7,015,655 B2
(45) Date of Patent: Mar. 21, 2006

(54) ELECTRONIC BALLAST FOR A HIGH INTENSITY DISCHARGE LAMP

(75) Inventors: Takeshi Kamoi, Uji (JP); Minoru Maehara, Matsubara (JP); Masanori Mishima, Souraku-gun (JP); Takahiro Abe, Morioka (JP)

(73) Assignee: Matsushita Electric Works, Ltd., Osaka (JP)

( * ) Notice: Subject to any disclaimer, the term of this patent is extended or adjusted under 35 U.S.C. 154(b) by 9 days.

(21) Appl. No.: 10/478,506

(22) PCT Filed: May 20, 2002

(86) PCT No.: PCT/JP02/04872

§ 371 (c)(1),
(2), (4) Date: Apr. 19, 2004

(87) PCT Pub. No.: WO02/098186

PCT Pub. Date: Dec. 5, 2002

(65) Prior Publication Data

US 2004/0183472 A1    Sep. 23, 2004

(30) Foreign Application Priority Data

May 25, 2001  (JP)  .............................. 2001-157565
Nov. 29, 2001  (JP)  .............................. 2001-365077
Jan. 28, 2002  (JP)  .............................. 2002-018854

(51) Int. Cl.
*G05F 1/00*          (2006.01)

(52) U.S. Cl. .............. 315/291; 315/209 R; 315/DIG. 5
(58) Field of Classification Search ................ 315/224, 315/225, 291, 307, 219, 209 R, DIG. 4, DIG. 5
See application file for complete search history.

(56) References Cited

U.S. PATENT DOCUMENTS

| 5,365,151 | A |   | 11/1994 | Spiegel et al. |
| 5,481,162 | A |   | 1/1996  | Boenigk et al. |
| 5,623,187 | A |   | 4/1997  | Caldeira et al. |
| 5,691,605 | A | * | 11/1997 | Xia et al. ..................... 315/307 |
| 5,828,178 | A |   | 10/1998 | York et al. |
| 5,872,429 | A | * | 2/1999  | Xia et al. ..................... 315/194 |
| 5,969,484 | A | * | 10/1999 | Santi et al. .................. 315/247 |
| 6,094,017 | A | * | 7/2000  | Adamson ..................... 315/307 |

(Continued)

FOREIGN PATENT DOCUMENTS

EP          0 405 674 A1     1/1991

(Continued)

OTHER PUBLICATIONS

International Search Report for PCT/JP02/04872 mailed on Oct. 1, 2003.

*Primary Examiner*—Thuy V. Tran
*Assistant Examiner*—Marie Antoinette Cabucos
(74) *Attorney, Agent, or Firm*—Rader, Fishman & Grauer PLLC

(57) ABSTRACT

An electronic ballast for a discharge lamp is capable of dimming the lamp over a wide range, yet minimizing a color temperature deviation. The ballast includes a power converter which converts an input DC voltage into a lamp power for driving the lamp, and a dimmer providing a dimmer command of a varying dimming ratio in order to reduce the lamp power to a greater extent as the dimming ratio decreases. A controller controls the power converter to supply a high frequency AC current to the lamp in response to the dimming ratio decreasing to a predetermined level, and to reduce an RMS value of the high frequency AC current as the dimming ratio decreases past the predetermined level.

20 Claims, 22 Drawing Sheets

U.S. PATENT DOCUMENTS

| | | | |
|---|---|---|---|
| 6,163,115 A * | 12/2000 | Ishizuka | 315/308 |
| 6,198,236 B1 * | 3/2001 | O'Neill | 315/307 |
| 6,486,616 B1 * | 11/2002 | Liu et al. | 315/291 |
| 6,548,963 B1 * | 4/2003 | Van Casteren et al. | 315/209 R |
| 6,600,271 B1 * | 7/2003 | Chen | 315/224 |
| 6,850,015 B1 * | 2/2005 | Ishizuka et al. | 315/224 |

FOREIGN PATENT DOCUMENTS

| | | |
|---|---|---|
| EP | 0 439 864 A1 | 8/1991 |
| EP | 0 504 967 A1 | 9/1992 |
| EP | 0 679 047 A2 | 10/1995 |
| EP | 0 855 852 A2 | 7/1998 |
| JP | 3-156897 A1 | 7/1991 |

* cited by examiner dimming ratio (%)
actual lamp power / rated lamp power

ELECTRONIC BALLAST FOR A HIGH INTENSITY DISCHARGE LAMP

TECHNICAL FIELD

The present invention relates to an electronic ballast for a high intensity discharge lamp, and more particularly to an electronic ballast with a dimmer control capability for dimming the discharge lamp.

BACKGROUND ART

Japanese Patent Early Publication No. 3-156897 discloses a prior art electronic ballast for a high intensity discharge lamp with a dimming capability. The prior art ballast includes a power converter which converts a DC voltage into a low frequency rectangular waveform AC voltage being applied to the discharge lamp, a controller which controls the power converter, and a dimmer which provides a dimmer command of varying a dimming ratio, i.e., a percentage of actual or reduced lumens to the rated lumens. In response to the dimmer command, the controller controls the power converter to vary a lamp power being supplied to the discharge lamp for reducing the lamp power in accordance with the dimming ratio. In order to keep the color temperature of the lamp within a tolerable range while varying the lumens, the power converter is controlled to generate high frequency ripples superimposed on the low frequency rectangular waveform AC voltage, as shown in FIG. 1. That is, when the dimming is requested, the controller operates to increase an amplitude of the high frequency ripples relative to that of the low frequency rectangular waveform AC voltage, thereby lowering the lamp power being supplied to the discharge lamp while reducing a deviation of color temperature of the lamp. However, it is found that this control scheme is satisfactory only to a limited dimming extent of about 80% of the rated lumens, because of that the amplitude of the ripples is only allowed to increase up to about 70% relative to the amplitude of the low frequency wave form AC voltage.

DISCLOSURE OF THE INVENTION

The present invention has been accomplished in view of the above insufficiency to provide an improved electronic ballast for a high intensity discharge (HID) lamp which is capable of dimming the lamp over a wide range, yet minimizing a color temperature deviation while dimming the lamp. It is revealed that the HID lamps generally exhibit an inherent characteristic that the color temperature of the lamp will vary significantly when electrodes of the lamp are subject to a considerable temperature lowering during the lamp operation. For a typical metal halide HID lamp containing sodium halide as a principal constituent for the color temperature, it is found that vapor pressure of the sodium halide will be lowered considerably with the temperature lowering of the electrodes, resulting in considerably color temperature deviation. Since the electrode's temperature would be lowered as the lamp power is reduced for dimming the lamp with the use of the prior art ballast which supplies a low frequency AC current of several tens of Hz to several hundreds of Hz, the lamp would suffer from an unacceptable color temperature deviation from the rated color temperature during a course of dimming the lamp.

The present invention is aimed to avoid the temperature lowering of the electrode as much as possible while the lamp power is reduced, thereby enabling to dim the lamp over a wide range while minimizing the color temperature deviation. In order to realize this purpose, the ballast of the present invention utilizes a high frequency AC current of several tens of kHz to several hundreds of kHz for operating the lamp based upon a finding that electrons responsible for supplying the lamp power will impinge intermittently upon the electrodes acting as an anode of the lamp so as to raise the electrode temperature and that no substantial temperature lowering occurs at the electrodes acting as a cathode of the lamp due to heat capacity of the electrode. Thus, it becomes possible to adjust the lamp power over a wide range without causing undue color temperature deviation by varying RMS (root-mean-square) value of the high frequency AC current being supplied to the lamp.

The electronic ballast in accordance with the present invention includes a power converter which converts an input DC voltage into a lamp power for driving the discharge lamp, and a dimmer which provides a dimmer command of a varying dimming ratio in order to reduce the lamp power for dimming the lamp to a greater extent as the dimming ratio decreases. A controller is included in combination with the dimmer and the power converter to receive the dimmer command for lowering the lamp power as the dimming ratio decreases. The characterizing feature of the present invention resides in that the controller controls the power converter to supply a high frequency AC current to the discharge lamp in response to the dimming ratio decreasing to a predetermined level, and that the controller controls to reduce an RMS value of the high frequency AC current as the dimming ratio decreases past the predetermined level. With the use of the high frequency AC current, the lamp power can be adjusted over a wide range simply by varying the RMS value of the high frequency AC current, while retaining an advantage of keeping the lamp at a raised temperature due to an intermittent bombardment of electrons upon electrodes of the lamp for minimizing a deviation in color temperature during the control of dimming the lamp from its rated lumens to reduced lumens.

The high frequency AC current is preferred to have a frequency of several tens of kHz to several hundreds of kHz in order to avoid undesired acoustic resonance of the lamp.

In one version of the present invention, the power converter includes a DC supply providing a variably regulated DC voltage from the input DC voltage, and an inverter which converts the regulated DC voltage into the high frequency AC current of a variable RMS value. In this version, the controller is connected to the DC supply so that the controller, in response to the decreasing dimming ratio, controls to lower the DC voltage for reducing the RMS value of the high frequency AC current for dimming the lamp as intended by the dimmer command.

The controller may be configured to supply the high frequency AC current also when the dimmer ratio is 100%, i.e., for operating the lamp at the rated power.

The ballast may further include a sensor which monitors the color temperature of the lamp, and a limiter provided with a memory for storing a rated color temperature of the lamp operating at its rated lamp power and an admissible color temperature difference. The limiter operates to compare an instant color temperature of the lamp being dimmed with the rated color temperature, and to provide a limit signal to the controller when the instant color temperature becomes deviated from the rated color temperature by an extent greater than the admissible color temperature difference. Upon receiving the limit signal, the controller operates to limit a further lowering of the lamp power in order to keep the color temperature of the lamp within a consistent range not significantly changing color perception. In this connection, it is preferred that the limiter includes a setting means for variably setting the admissible color temperature, enabling to select an optimum dimming range for different types of lamps which exhibit different color temperature characteristics in relation to the varying lamp power.

In order to vary the RMS value of the high frequency AC current, the controller may be configured to increase a frequency of the AC current as the dimming ratio decreases. This is also effective to expand a range of dimming the lamp without accompanying undesired color temperature deviation.

For operating the lamp at the rated lamp power, the power converter may be controlled to generate one of a low frequency rectangular waveform AC current and a DC current. In this case, when the dimming ratio decreases past the predetermined level, the controller responds to control the power converter for supplying the high frequency AC current with varying RMS value in proportion to the dimming ratio decreasing past the predetermined level. The low frequency rectangular waveform AC current is preferred to have a frequency of several tens of Hz to several hundreds of Hz.

When the power converter is configured to generate the low frequency rectangular waveform AC current and the high frequency AC current selectively under the control of the controller, it is preferred to switch the low frequency AC current to the high frequency AC current effectively while dimming the lamp to a greater extent, yet minimizing the color temperature deviation. For this purpose, the ballast may include a sensor monitoring the color temperature of the lamp and a selector having a memory for storing a rated color temperature of the lamp operating at its full lamp power and storing a predetermined admissible color temperature difference. The selector compares an instant color temperature of the lamp with the rated color temperature, and provides a switchover signal when the instant color temperature becomes deviated from the rated color temperature by an extent greater than the admissible color temperature difference. Normally, the controller controls the power converter to generate the low frequency rectangular waveform AC current for the operating the lamp at the rated lamp power, and to decrease the amplitude of the low frequency rectangular waveform AC current as the dimming ratio decreases in the absence of the switchover signal. Upon seeing the switchover signal as a consequence of the lamp being dimmed to a further extent, the controller controls the power converter to generate the high frequency AC current and decrease the RMS current of the high frequency AC current as the dimming ratio decreases. Thus, it is possible to operate the ballast efficiently by incorporating the low frequency rectangular waveform AC current for dimming the lamp at a relatively high dimming ratio, while assuring to expand the dimming range with the use of the high frequency AC current without causing undesired color temperature deviation. Further, with the use of the selector, the ballast can start providing the high frequency AC current at an optimum timing so as not to cause undue color temperature deviation which would otherwise appear when the lamp is dimmed to a further extent with the low frequency voltage. In view of that the HID lamps of different types exhibit different color temperature characteristics in relation to the varying lamp power, the selector is preferred to include a setting means for variably setting the admissible color temperature, enabling to give the optimum timing at which the ballast starts providing the high frequency AC current depending upon the lamp selected.

In another preferred version, the controller is configured to control the power converter in order to generate a low frequency rectangular waveform AC current alternating the high frequency AC current for supplying the combination of the low and high frequency currents to the lamp in a course of dimming the lamp. That is, the high frequency current is supplied over a first duration subsequent to a second duration while the low frequency current is supplied. In response to the decreasing dimming ratio, the controller controls the power converter to increase a duration time ratio of the first duration to the second duration, thereby lowering the lamp power as intended. With the inclusion of the low frequency current while dimming the lamp, it is possible to reduce a switching loss due to the high frequency AC current while assuring to dim the lamp over a wide range without causing the substantial color temperature deviation.

Instead of providing the low frequency rectangular waveform AC current, the power converter may provide a DC current which is supplied over the second duration in an alternating manner with the first duration where the high frequency AC current is supplied.

The RMS current being fed to the lamp in the form of the high frequency AC current can be further adjusted by varying the frequency of the high frequency AC current. In this connection, it is preferred to control the power converter to keep generating the high frequency AC current of a fixed frequency until the dimming ratio decreases to a predetermined value, and to generate the high frequency AC current of which frequency increases with the dimming ratio decreasing past the predetermined value.

The high frequency AC current is preferred to have a crest factor of 1.4 or greater in order to enhance an effect of keeping the electrodes of the lamp at a raised temperature for minimizing the color temperature deviation while dimming the lamp.

A more complete appreciation of the invention and many of the attendant advantages thereof will become readily apparent with reference to the following detailed description, particularly when considered in conjunction with the accompanying drawings.

DETAILED DESCRIPTION OF THE EMBODIMENTS

Figure 1:
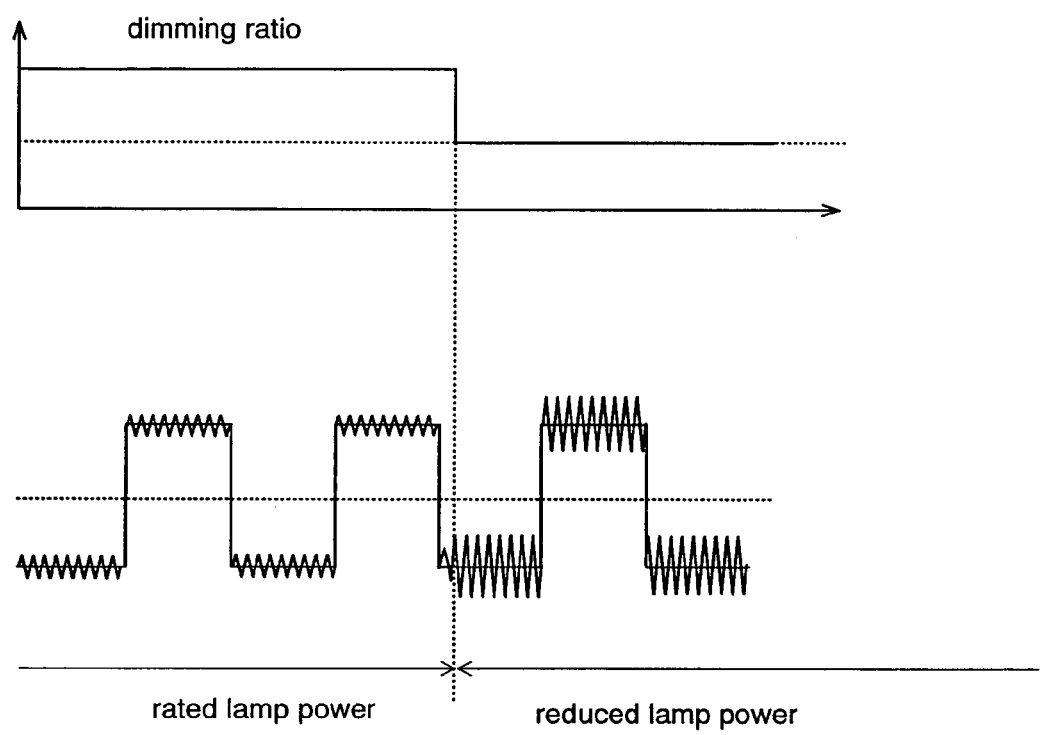
FIG. 1 is a waveform chart illustrating an operation of a prior art ballast.

The preferred embodiments will now be described with reference to the accompanying drawings, wherein like reference numerals designate corresponding or identical elements throughout the various drawings.

Figure 2:
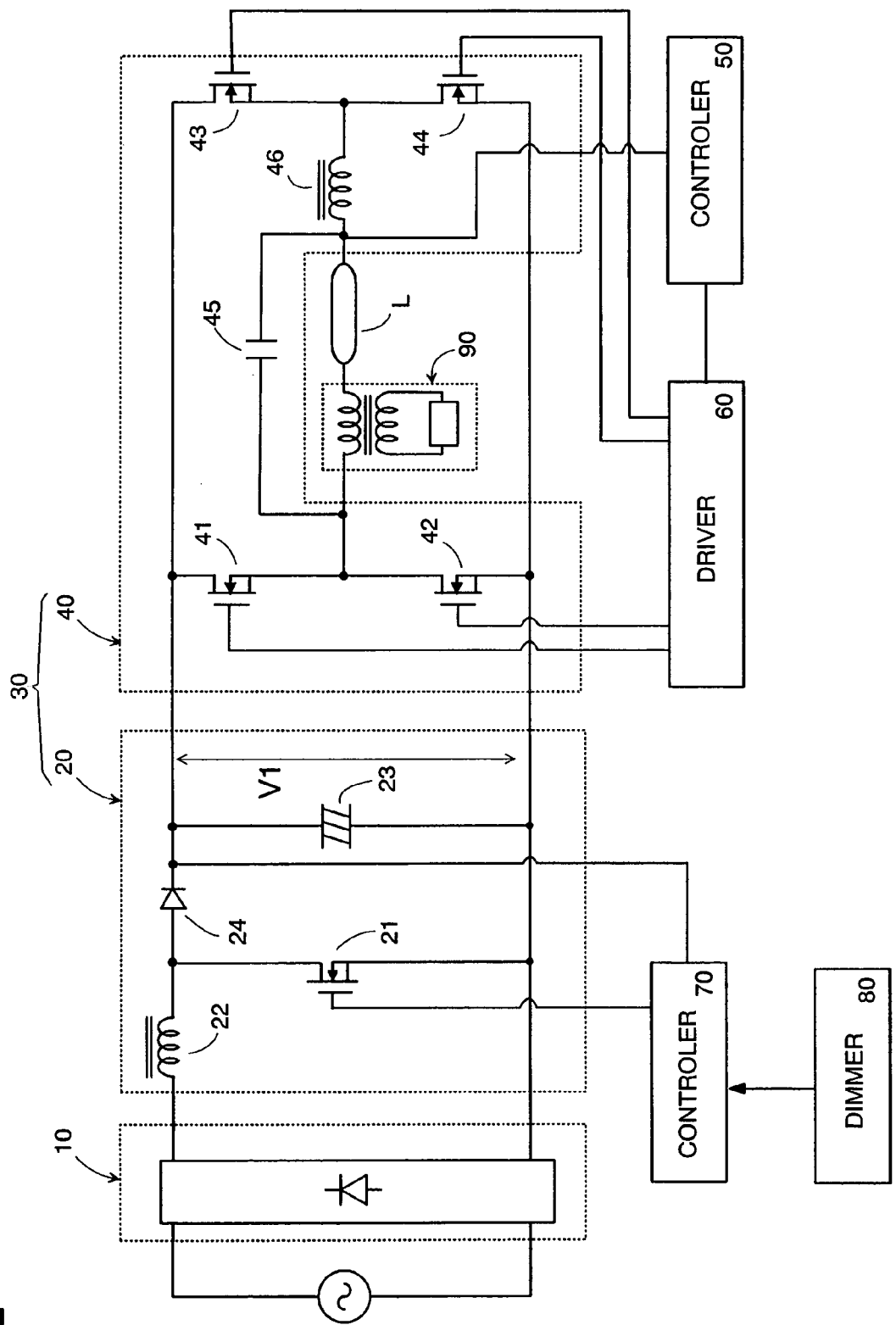
FIG. 2 is circuit diagram of an electronic ballast in accordance with a first embodiment of the present invention.
Figure 3:
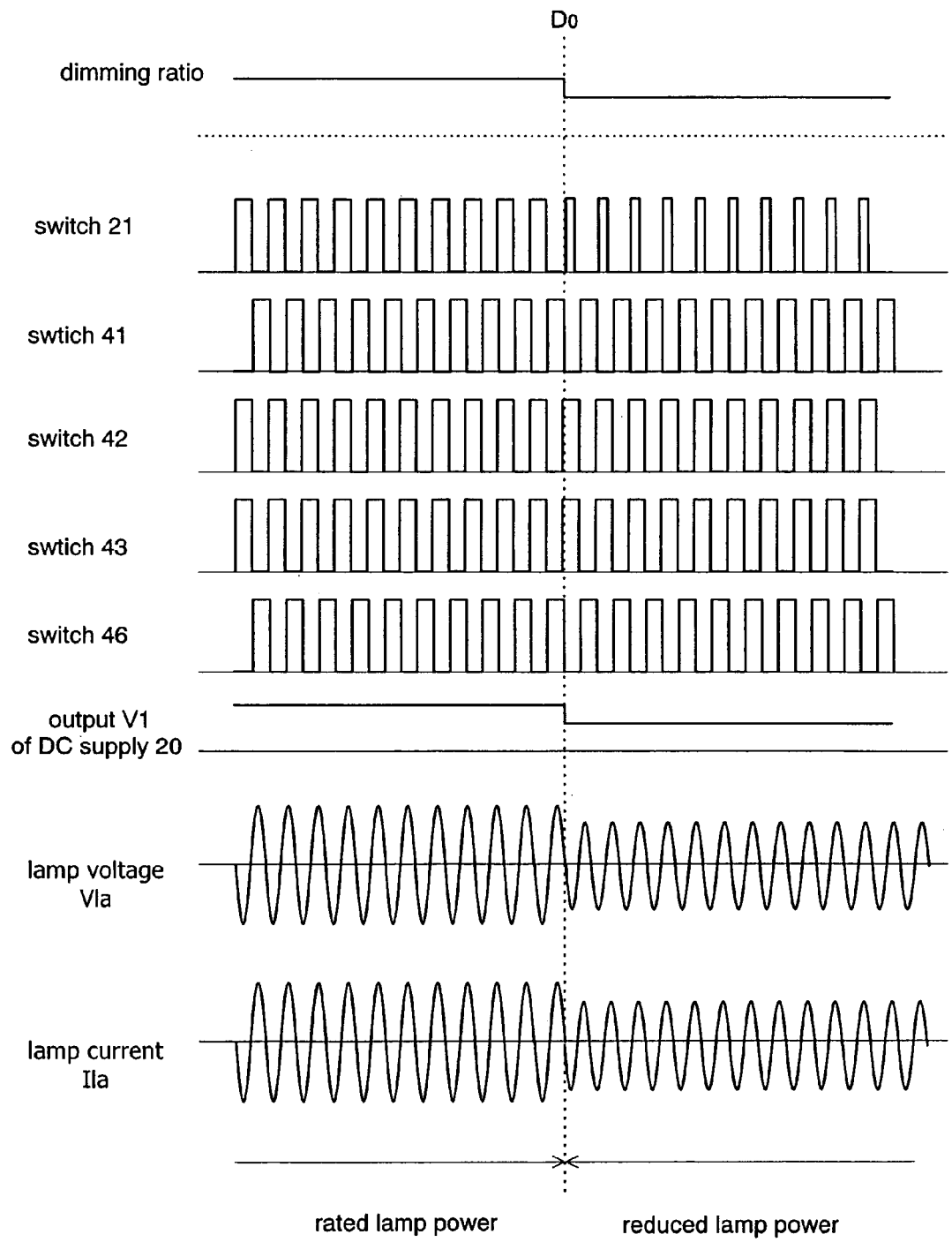
FIG. 3 is a waveform chart illustrating the operation of the above ballast.

First Embodiment <FIGS. 2 and 3>

Referring now to FIGS. 2 and 3, there is shown an electronic ballast for a high intensity discharge lamp in accordance with a first embodiment of the present invention. The ballast is designed to operate a wide variety of the high intensity discharge (HID) lamp, particularly the metal halide HID lamp having a transparent arc tube filled with a mixture of mercury and a metal halide containing at least sodium halide. The ballast includes a rectifier 10 adapted to connected to an AC mains to provide a rectified DC voltage, a power converter 30 which converts the rectified DC voltage into a lamp power for operating a lamp L, and an igniter 90 for igniting the lamp. The power converter 30 is composed of a DC supply 20 providing from the rectified DC voltage a regulated DC voltage, and an inverter 40 converting the regulated DC voltage into a high frequency AC voltage of sinusoidal waveform which is applied as the lamp power to the lamp L. The inverter 40 is controlled by a controller 50 through a driver 60 to generate the high frequency AC current. Also, the DC supply 20 is controlled by an associated controller 70 to provide the regulated DC voltage which is boosted from the rectified DC voltage of the rectifier 10.

The DC supply 20 is configured as a step-up chopper which includes a switch 21 connected in series with an inductor 22 across the rectifier 10, a smoothing capacitor 23 connected in series with a diode 24 across the rectifier 10 in a parallel relation to the switch 21. The switch 21, which is a switching transistor, is controlled by the controller 70 to repetitively turn on and off at a high frequency of several tens of kHz to several hundreds of kHz, thereby boosting the rectified voltage and accumulating the voltage across the smoothing capacitor 23 which in turn provides the regulated DC voltage V1 to the inverter 40. The controller 70 is connected in circuit to monitor the voltage V1 across the smoothing capacitor 23 so as to control the frequency of the switch 21 in order to keep the regulated DC voltage V1 at a predetermined level.

The inverter 40 includes a first pair of switches 41 and 42 connected in series across the smoothing capacitor 23, and second pair of switches 43 and 44 connected in series across the smoothing capacitor 23 in parallel with the first pair. Also included in the inverter is a capacitor 45 connected across the lamp L, and an inductor 46 which is connected in series with the lamp L between a connection point of switches 41 and 42 and a connection point of switches 43 and 44. The switches 41 to 44 are driven by a driver 60 to turn on and off at a high frequency of several tens of kHz to several hundreds of kHz in a manner as shown in FIG. 3, to apply a resulting high frequency sinusoidal wave AC voltage Vla to the lamp and therefore supply a corresponding high frequency AC current Ila thereto for operating the lamp L. The driver 60 is controlled by the controller 50 which monitors the AC voltage being applied to the lamp in order to cause the driver and therefore the inverter to keep generating the high frequency AC current having a constant RMS value. The high frequency AC voltage is selected to have a frequency higher than a critical level below which an acoustic resonance is expected to occur. Although the critical level may differ for different lamps, it is preferred to select the high frequency above 200 kHz in order to avoid the acoustic resonance for most of the lamps.

The ballast includes a dimmer 80 which gives a dimmer command of a variable dimming ratio which is defined in the description to be a ratio of a reduced lumens to a rated lumens, i.e., the reduced lamp power to a rated lamp power. For easy reference purpose, the dimming ratio is expressed in term of a percentage throughout the description. For example, 80% dimming ratio means 80% of full lamp power or lumens. The dimmer 80 is accessible by a user to adjust the dimming ratio. Upon receiving the dimmer command of thus adjusted dimming ratio, the controller 70 lowers the duty cycle of the switch 21 for lowering the regulated DC voltage V1, thereby lowering the RMS value of high frequency AC current being supplied to the lamp for dimming the lamp in accordance with the dimmer ratio, as shown in FIG. 3 in which the lamp power is reduced as the dimmer ratio decreases from 100% at a timing D0.

Figure 4:
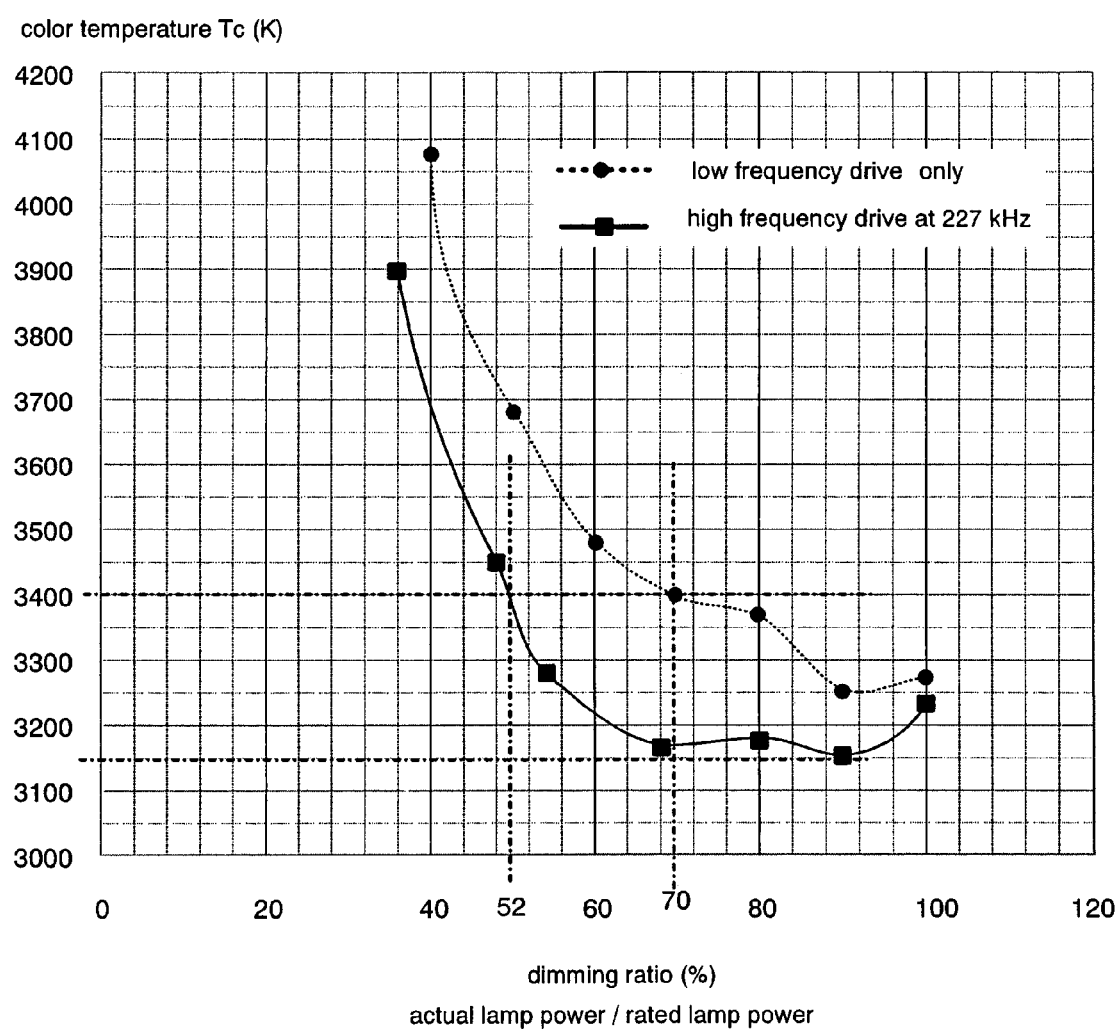
FIG. 4 is a graph explaining the feature of the above ballast.

As discussed previously, when dimming the lamp with the use of the high frequency AC current, the electrodes of the lamp is kept at the raised temperature higher than that expected with the use of the low frequency current. Therefore, a partial vapor pressure of the sodium halide, the principal constituent responsible for giving the color temperature, is kept substantially unchanged while the lamp power is reduced. Whereby, it is enabled to reduce the lamp power over a wide range, i.e., dimming the lamp to a large extent, yet minimizing the color temperature deviation, as shown in FIG. 4 in which a solid curve indicates the color temperature varying with the lamp power when operating the lamp with the high frequency AC current, and a dotted curve indicates the color temperature change when operating the same lamp with the low frequency current. It is confirmed from FIG. 4 that the high frequency drive can afford the dimming ratio down to about 52%, while the low frequency drive affords the dimming ratio down only to 70% when limiting the color temperature below 3400 K, or within about ±150 K.

Figure 5:
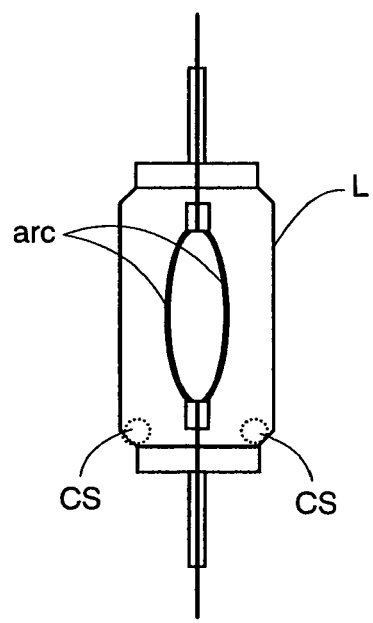
FIGS. 5 and 6 are schematic views respectively illustrating manners of driving a high intensity discharge lamp.
Figure 6:
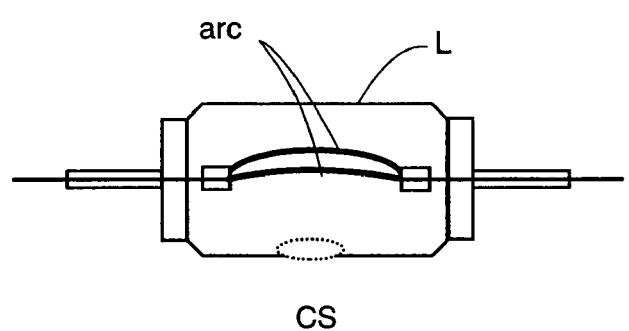

The ballast is particularly suitable for a vertical lamp drive, as shown in FIG. 5, rather than a horizontal lamp drive as shown in FIG. 6, because of that cold spots (CS) are formed closer to the electrode in the vertical-drive than in the horizontal-drive and are more susceptible with the heat accumulated in the electrode to enhance the effect of minimizing the color temperature deviation.

Figure 7:
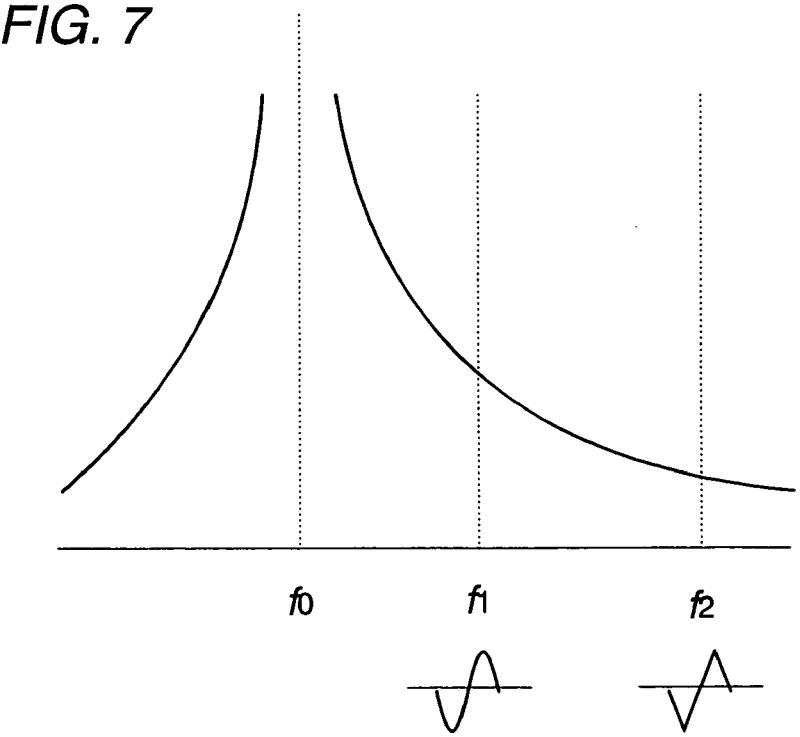
FIG. 7 is a chart illustrating modified operation of the ballast.

The high frequency AC current in the sinusoidal waveform is suitable for reason of that it gives a crest factor of about 1.4 with a sufficient peak value responsible for raising the electrode temperature due to the collision of the electrons of correspondingly high energy to the electrode. However, the effect of raising the electrode temperature can be enhanced by using the high frequency AC current of a triangular waveform having a high crest factor of about 1.7. This is accomplished by driving the inverter 40 at such a frequency f2 which, as shown in FIG. 7, is offset from a resonance frequency f0 given to a resonant circuit of capacitor 45 and inductor 46 by a greater extent than a frequency f1 which is responsible for the sinusoidal waveform.

Figure 8:
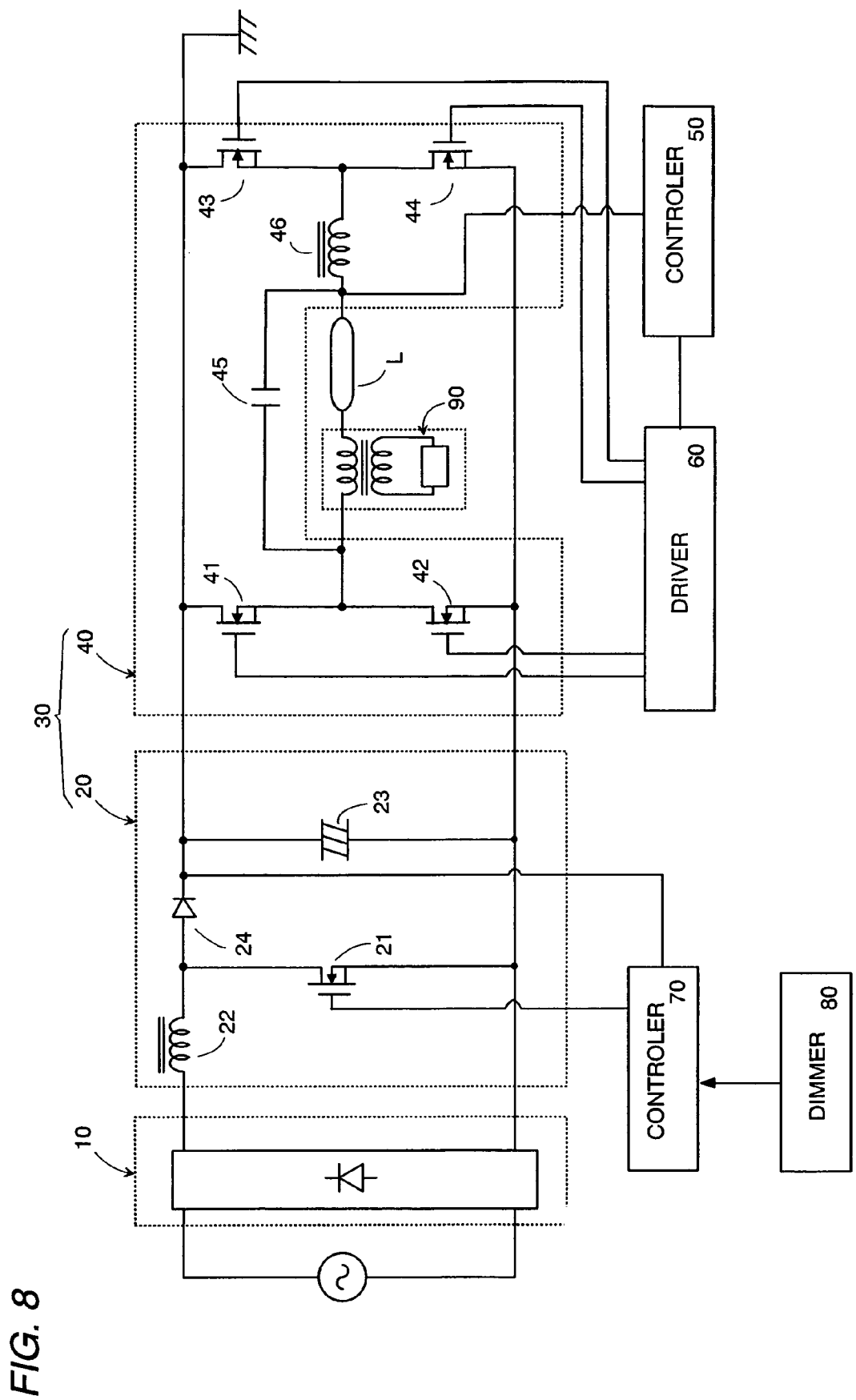
FIG. 8 is a circuit diagram illustrating a modification of the above ballast.

As shown in FIG. 8, the ballast may be modified to be grounded at a high-side of the power converter 30 such that the electrodes of the lamp L have a potential lower than the ground. This is advantageous for restraining sodium ions from acting with quarts of the tube and therefore reduction in the amount of the sodium ions which might lower the lumens and possibly bring about a color change.

Figure 9:
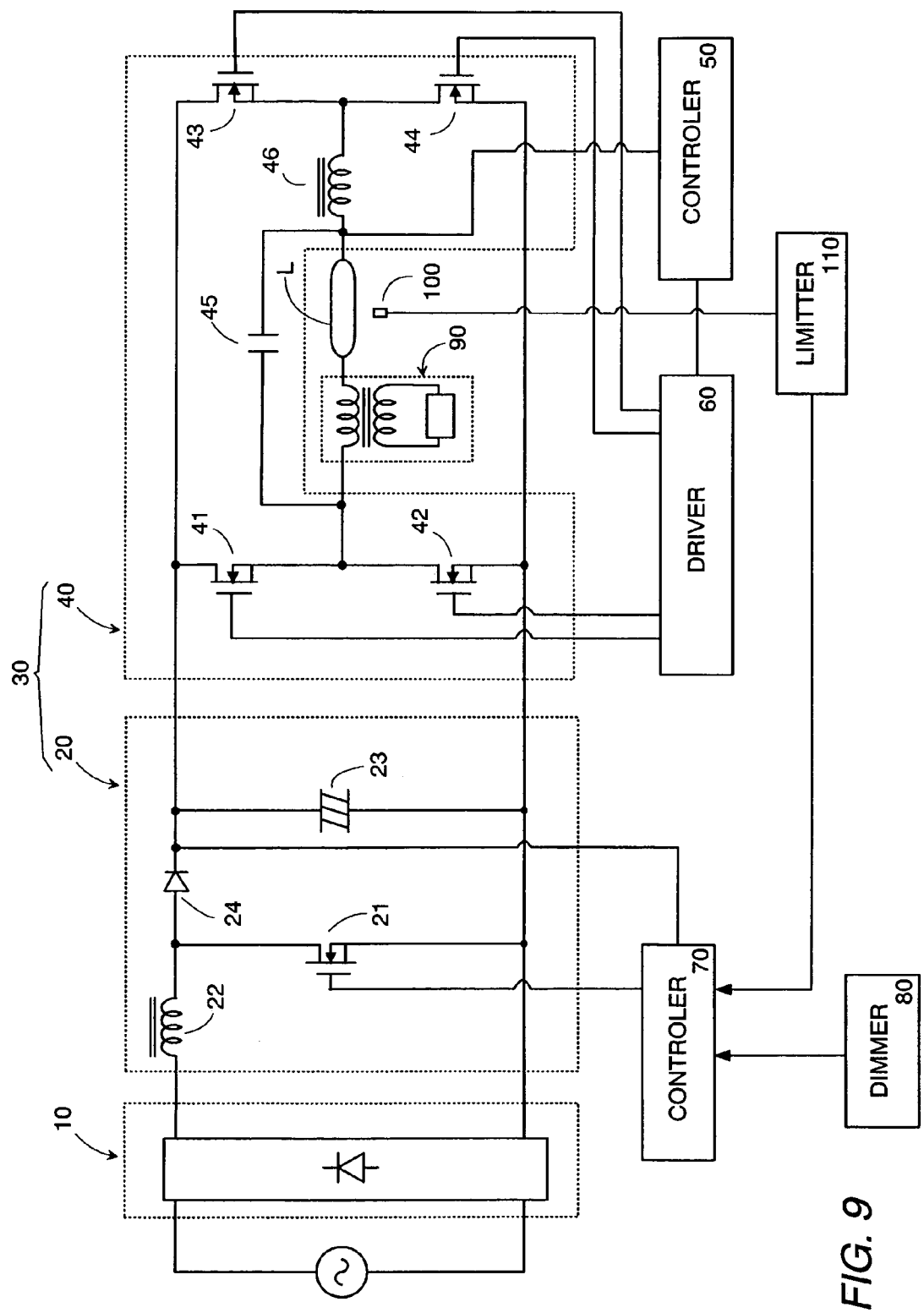
FIG. 9 is a circuit diagram of an electronic ballast in accordance with a second embodiment of the present invention.
Figure 10:
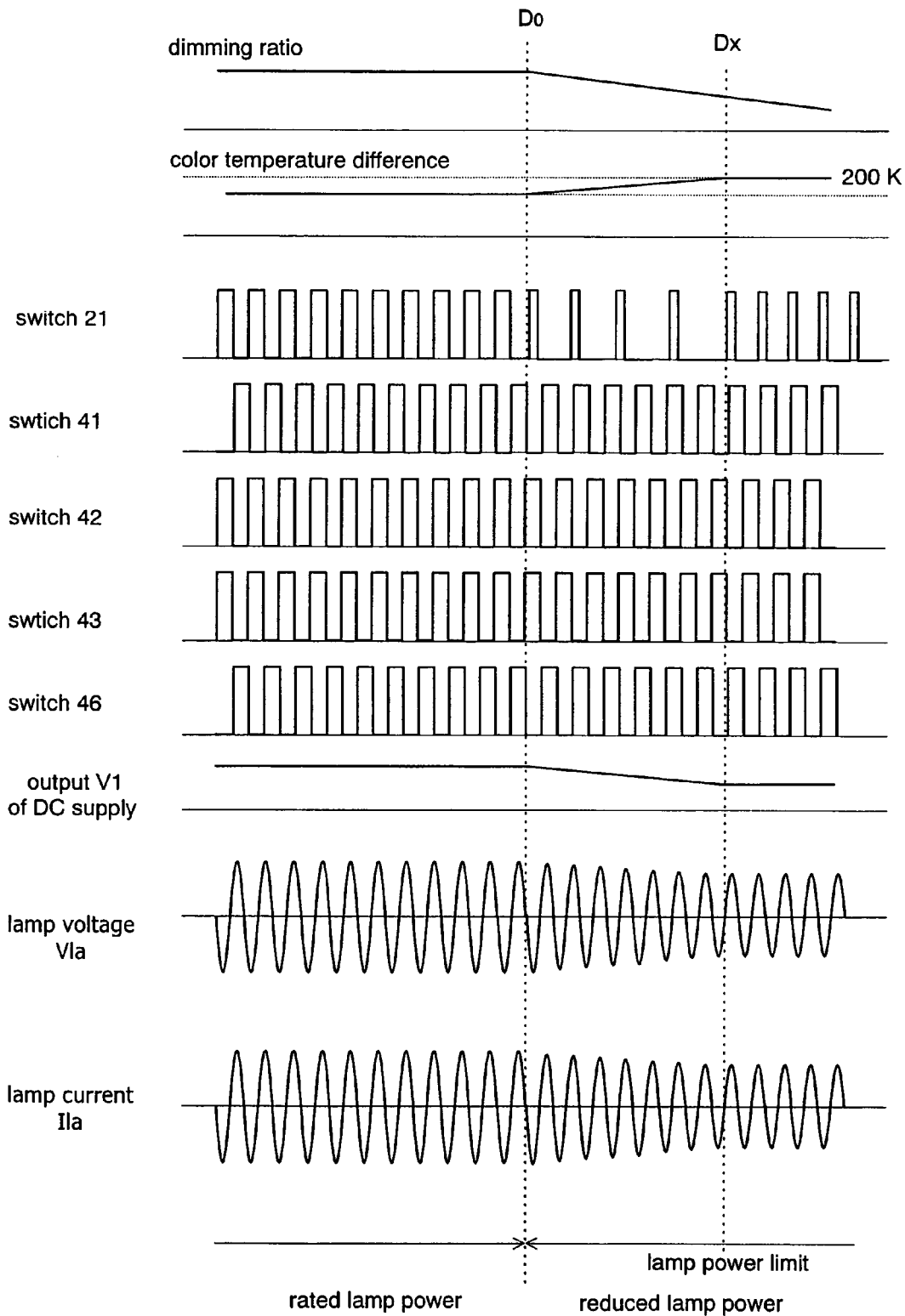
FIG. 10 is a waveform chart illustrating the operation of the above ballast.

Second Embodiment <FIGS. 9 and 10>

FIGS. 9 and 10 show an electronic ballast in accordance with a second embodiment of the present invention which is identical to the first embodiment except that a sensor 100 for monitoring the color temperature of the lamp is added together with a limiter 110 which limits the dimmer control from reducing the lamp power to such a level that will cause inadmissible color temperature deviation from the rated color temperature. The limiter 110 includes an internal memory for storing the rated color temperature of the lamp L monitored at its rated lamp power as well as for storing an admissible color temperature difference optionally entered by means of a setter (not shown). Each time the lamp is dimmed, the limiter 110 compares an instant color temperature of the lamp with the rated color temperature and provides a limit signal to the controller 70 when the instant color temperature becomes deviated from the rated color temperature by an extent greater than the admissible color temperature difference, for example, 200 K (shown at point Dx in FIG. 10). The limit signal is received by the controller 70 which responds to cancel a further decreasing dimming ratio given from the dimmer 80. Whereby, the controller 70 limits the DC supply 20 not to reduce the DC voltage V1 to a further extent, limiting a further lowering of the lamp power which would otherwise cause inadmissible color temperature deviation. Thus, irrespective of a possible variation in actual rated lamp power for the lamps of the same rating, the lamp can be dimmed without causing inadmissible color temperature deviation from the actual rated lamp power. Further, since the limiter 110 includes the setter for variably setting the admissible color temperature, the ballast can be adapted to operate various lamps of different ratings and therefore different admissible color temperature differences within which the lamp is intended to be dimmed.

Figure 11:
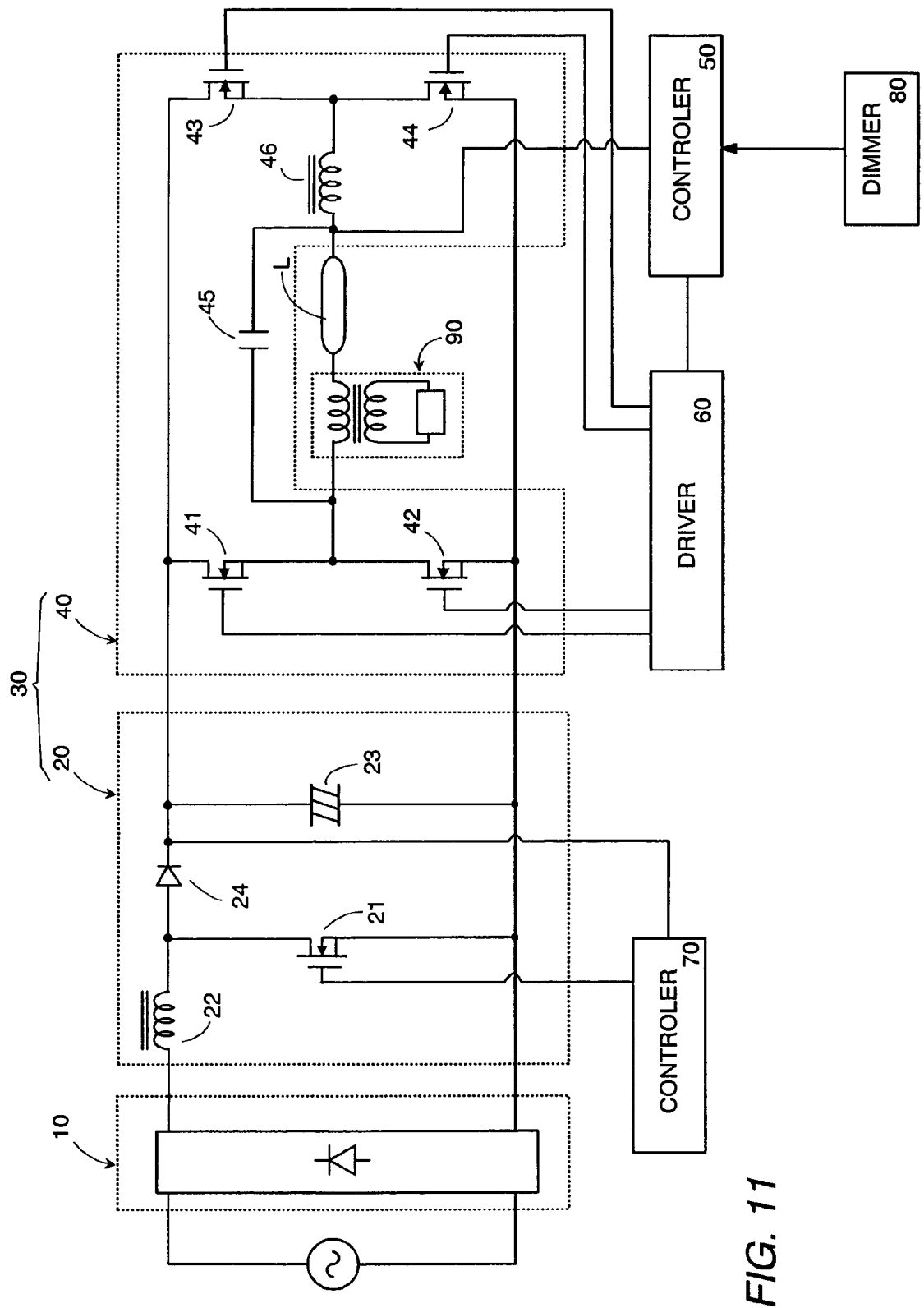
FIG. 11 is a circuit diagram of an electronic ballast in accordance with a third embodiment of the present invention.
Figure 12:
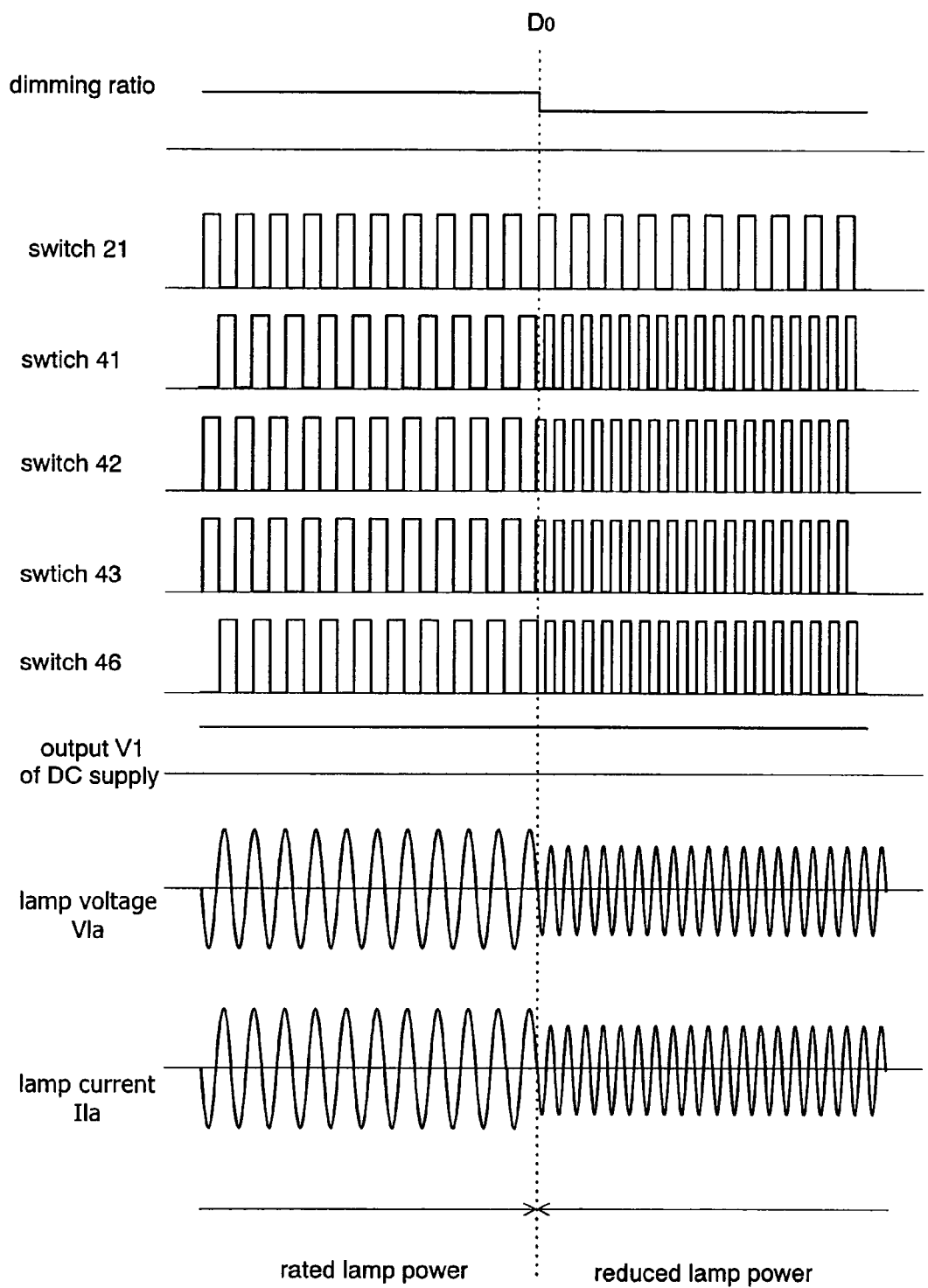
FIG. 12 is a waveform chart illustrating the operation of the above ballast.

Third Embodiment <FIGS. 11 and 12>

FIGS. 11 and 12 show an electronic ballast in accordance with a third embodiment of the present invention which is identical to the first embodiment except that the inverter 40 responds to the dimmer command for reducing the lamp power. For this purpose, the controller 50 is configured to increase the switching frequency for the switches 41 to 44 in response to the decreasing dimming ratio, thereby reducing the RMS value of the high frequency AC current being supplied to the lamp L for dimming the lamp. The ballast of the present embodiment may include the sensor 100 and the limiter 110 as utilized in the second embodiment.

Figure 13:
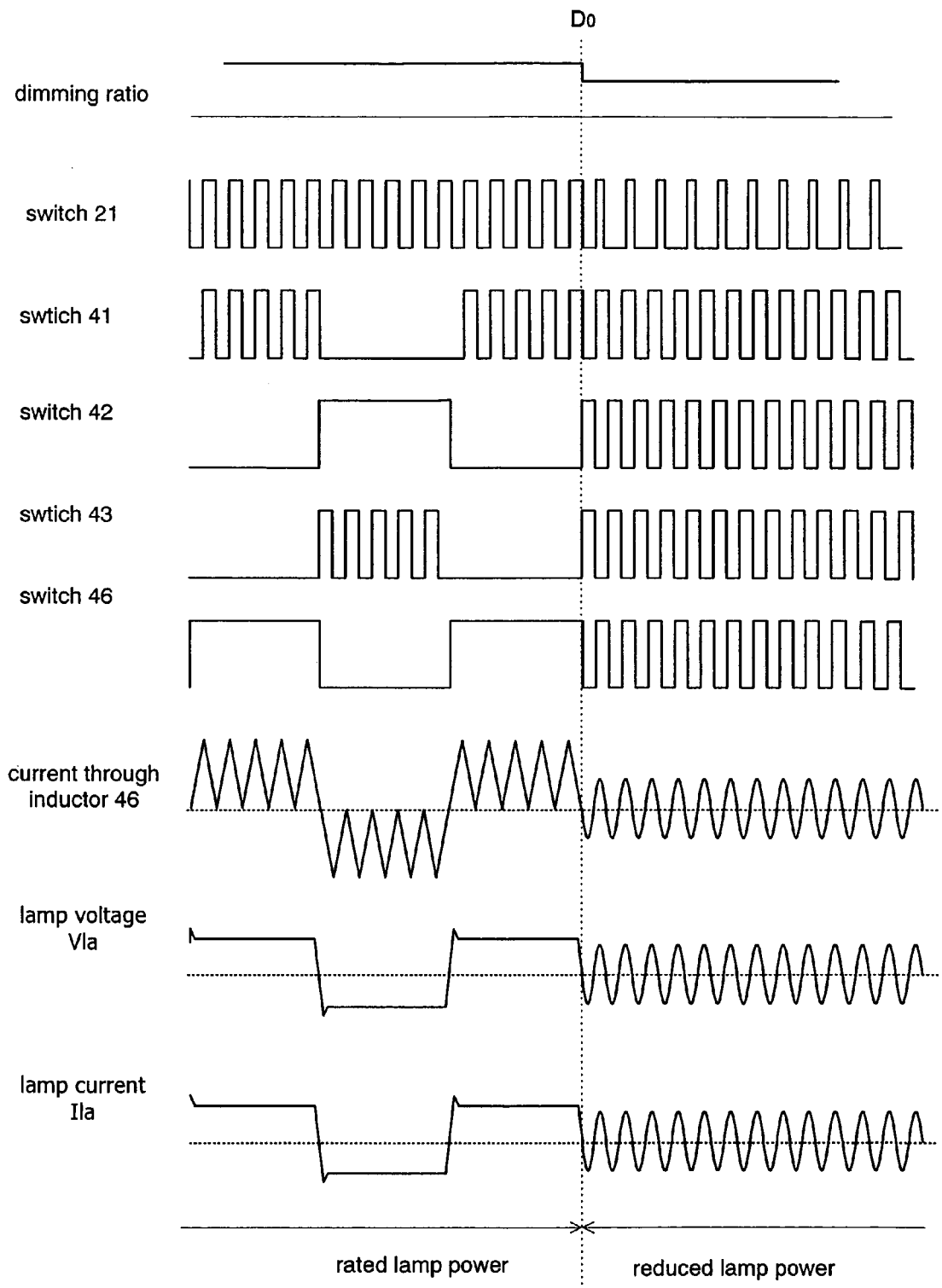
FIG. 13 is a waveform chart illustrating the operation of an electronic ballast in accordance with a fourth embodiment of the present invention.

Fourth Embodiment <FIG. 13>

FIG. 13 shows a waveform chart illustrating an operation of an electronic ballast in accordance with a fourth embodiment of the present invention. The ballast has a circuit which is basically identical to that employed in the third embodiment shown in FIG. 11 and therefore the circuit elements of FIG. 11 are referred to in the following explanation of the present embodiment. The ballast of the present embodiment differs from the third embodiment in that the inverter 40 is controlled by the controller 50 to provide a low frequency rectangular waveform AC voltage of several tens of Hz to several hundreds of Hz to the lamp for supplying the corresponding low frequency AC current when the lamp is operated at the rated power, i.e., at the dimming ratio of 100%. That is, while the dimmer command from the dimmer 80 designates 100% dimming ratio, the switches 41 and 44 are controlled to turn on and off as shown in FIG. 13, in such a manner that switches 42 and 44 turn on and off in an alternating fashion at the low frequency and switches 41 and 43 turn on and off at the high frequency respectively during on-periods of the switches 44 and 42. Thus, the inverter 40 converts the DC voltage from the DC supply 20 to provide the low frequency rectangular waveform AC voltage to the lamp for operating the lamp at the rated lamp power. When the dimming ratio decreases from 100% for dimming the lamp, the controller 50 responds to cause the inverter 40 to provide the high frequency AC voltage and current for reducing the lamp power in accordance with the dimming ratio, in the same manner as is made in the third embodiment. With the use of the low frequency rectangular waveform AC voltage for operating the lamp at the rated lamp power, it is possible to reduce a switching loss which is likely to be critical when driving the lamp at the rated lamp power with the high frequency AC voltage. It is noted that the switching loss due to the high frequency drive is reduced as the lamp power is reduced. Therefore, the combination of the low and high frequency drive is found efficient for operating the lamp at varying lamp power.

Figure 14:
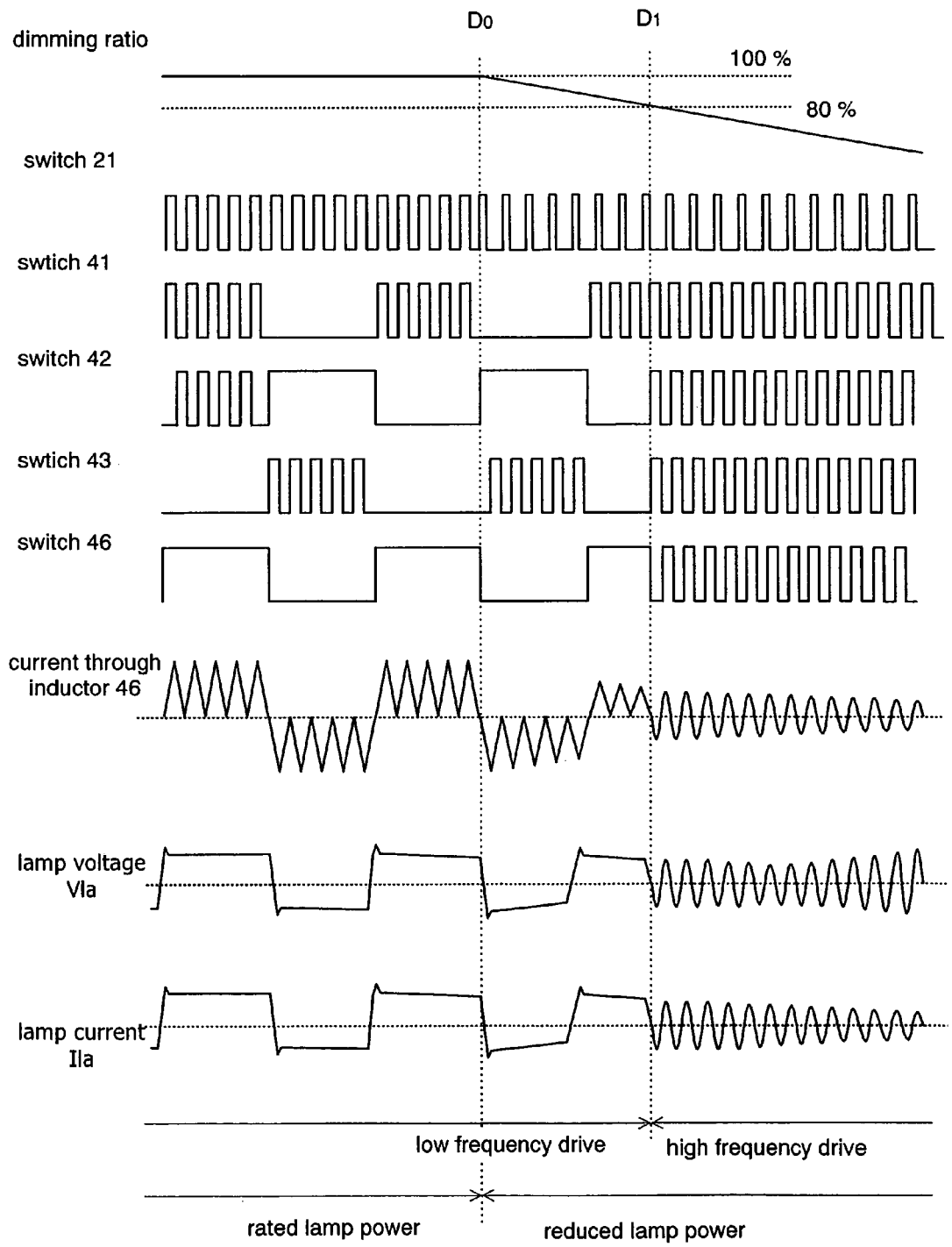
FIG. 14 is a waveform chart illustrating the operation of an electronic ballast in accordance with a modification of the fourth embodiment.

FIG. 14 shows a waveform chart with regard to an electronic ballast in accordance with a first modification of the fourth embodiment. The ballast is identical to the fourth embodiment except that the high frequency drive start after the dimming ratio lowers past a predetermined level D1, for example, 80%. Until the dimming ratio lowers to D1, the inverter is controlled to provide the low frequency AC voltage without causing substantial switching loss, and to provide the high frequency AC voltage after the dimming ratio lowers past 80% while reducing the effect of the switching loss as a result of reducing the lamp power. It is noted in this connection that the above control scheme is also preferred to avoid the acoustic resonance because of that the low frequency drive is far from causing the acoustic resonance and because of that the high frequency drive is made with the reduced lamp power not likely to give sufficient energy for initiating the acoustic resonance even with the high frequency being around the critical level for the acoustic resonance.

Figure 15:
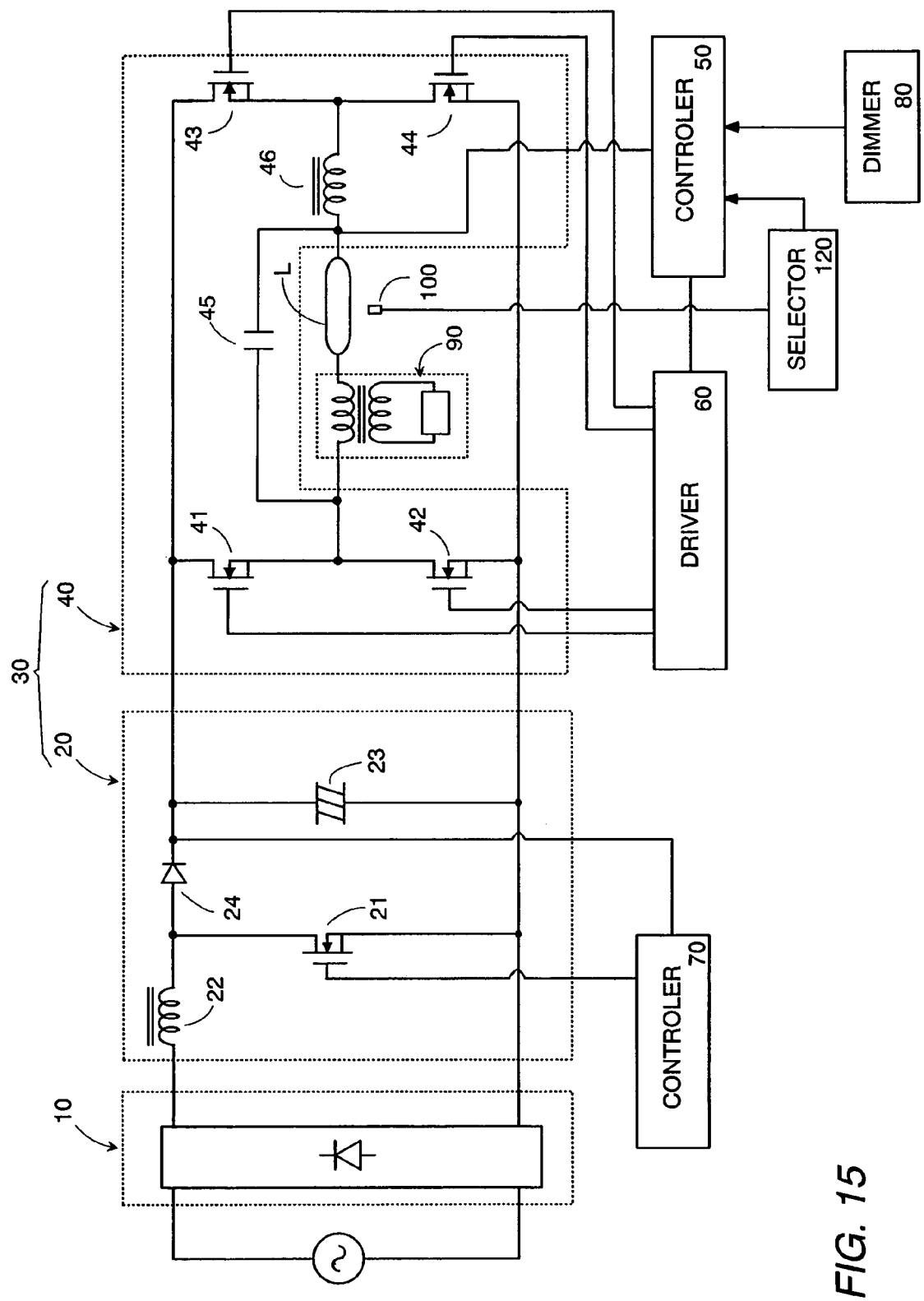
FIG. 15 is a circuit diagram of an electronic ballast in accordance with another modification of the fourth embodiment.
Figure 16:
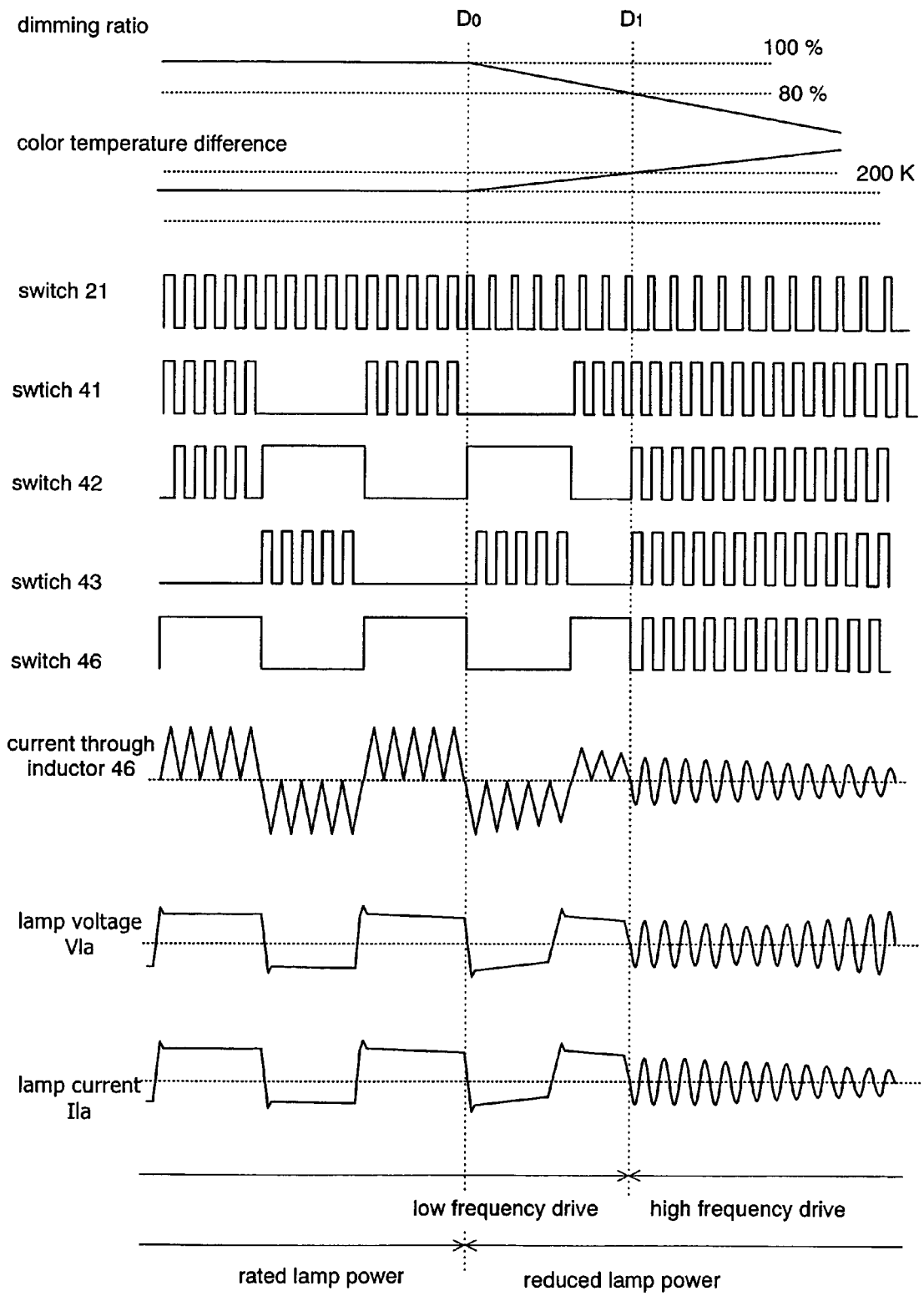
FIG. 16 is a waveform chart illustrating the operation of the above ballast.

FIG. 15 shows an electronic ballast in accordance with a second modification of the fourth embodiment which is identical to the above first modification of the fourth embodiment except that the high frequency drive starts after the dimming ratio lowers past a predetermined level D1 below which the lamp would suffer from an inadmissible color temperature deviation from the rated color temperature. For this purpose, the ballast includes a sensor 100 for monitoring the color temperature of the lamp, and a selector 120 which, based upon an instant color temperature of the lamp, selects the high frequency drive when the instant color temperature deviates from the rated color temperature to an inadmissible extent. The selector 120 includes an internal memory for storing the rated color temperature of the lamp L monitored at its rated lamp power as well as for storing an admissible color temperature difference optionally entered by means of a setter (not shown). Each time the lamp starts being dimmed, the selector 120 compares the instant color temperature of the lamp with the rated color temperature and provides a switchover signal to the controller 50 when the instant color temperature becomes deviated from the rated color temperature by an extent greater than the admissible color temperature difference, for example, 200 K (shown at point D1 in FIG. 16). The switchover signal is received by the controller 50 which responds to start providing the high frequency AC voltage from the inverter 40.

Figure 17:
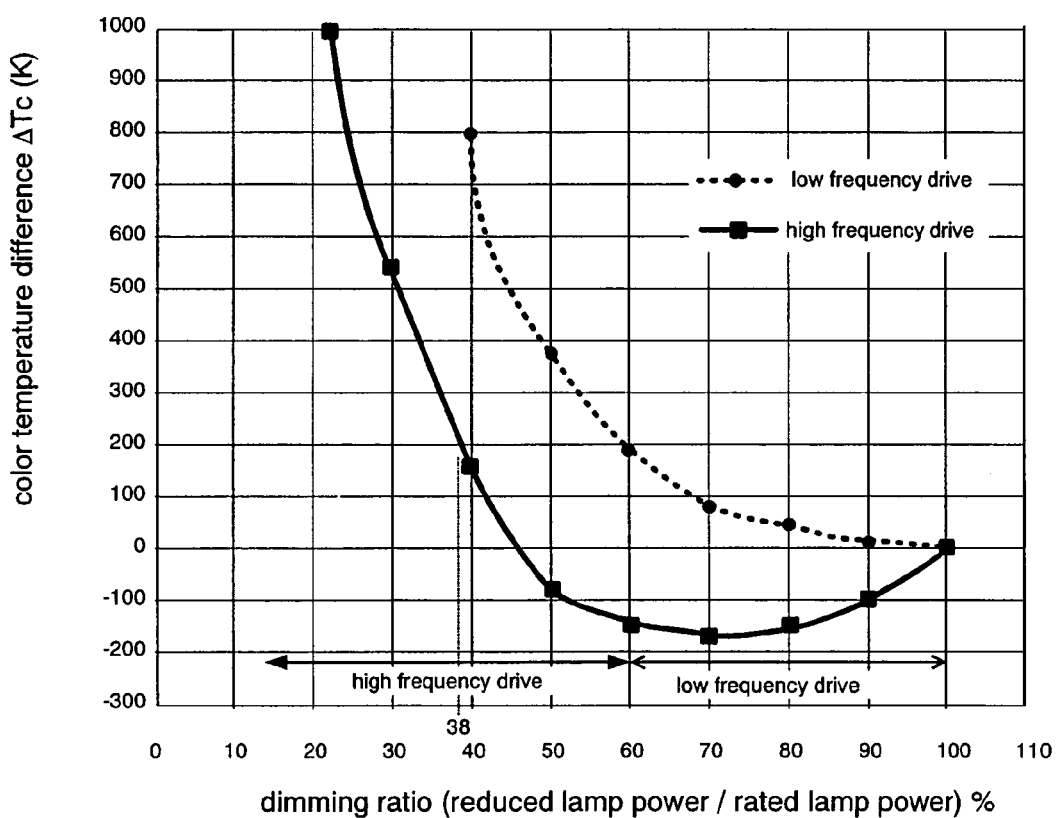
FIG. 17 is a graph illustrating the operation of the above modification.

With this control scheme of switching the low frequency drive to the high frequency drive based upon the color temperature difference experienced during the course of dimming the lamp, the low frequency drive can be effectively used for dimming the lamp to such an extent as not to cause substantial color temperature deviation while taking the advantage of the low frequency drive, and the high frequency drive is best utilized to dim the lamp to a large extent while maintaining the color temperature deviation within the admissible color temperature difference of 200 K. This is confirmed from FIG. 17 which shows the color temperature difference ΔTc (K) varying with the dimming ratio, i.e., the actual lamp power in relation to the rated lamp power, respectively with the low frequency drive (shown by a dotted line) and the high frequency drive (shown in a solid line). That is, the low frequency drive can be utilized for dimming the lamp down to 60% within the admissible color temperature difference of ±200 K, and the high frequency drive takes over for dimming the lamp to a further extent down to as less as 38% while maintaining the color temperature difference within±200 K.

The selector 120 is configured to accept at the setter the variable color temperature difference so that the ballast can be adapted to operate various lamps of different ratings which may give different admissible color temperature differences.

Figure 18:
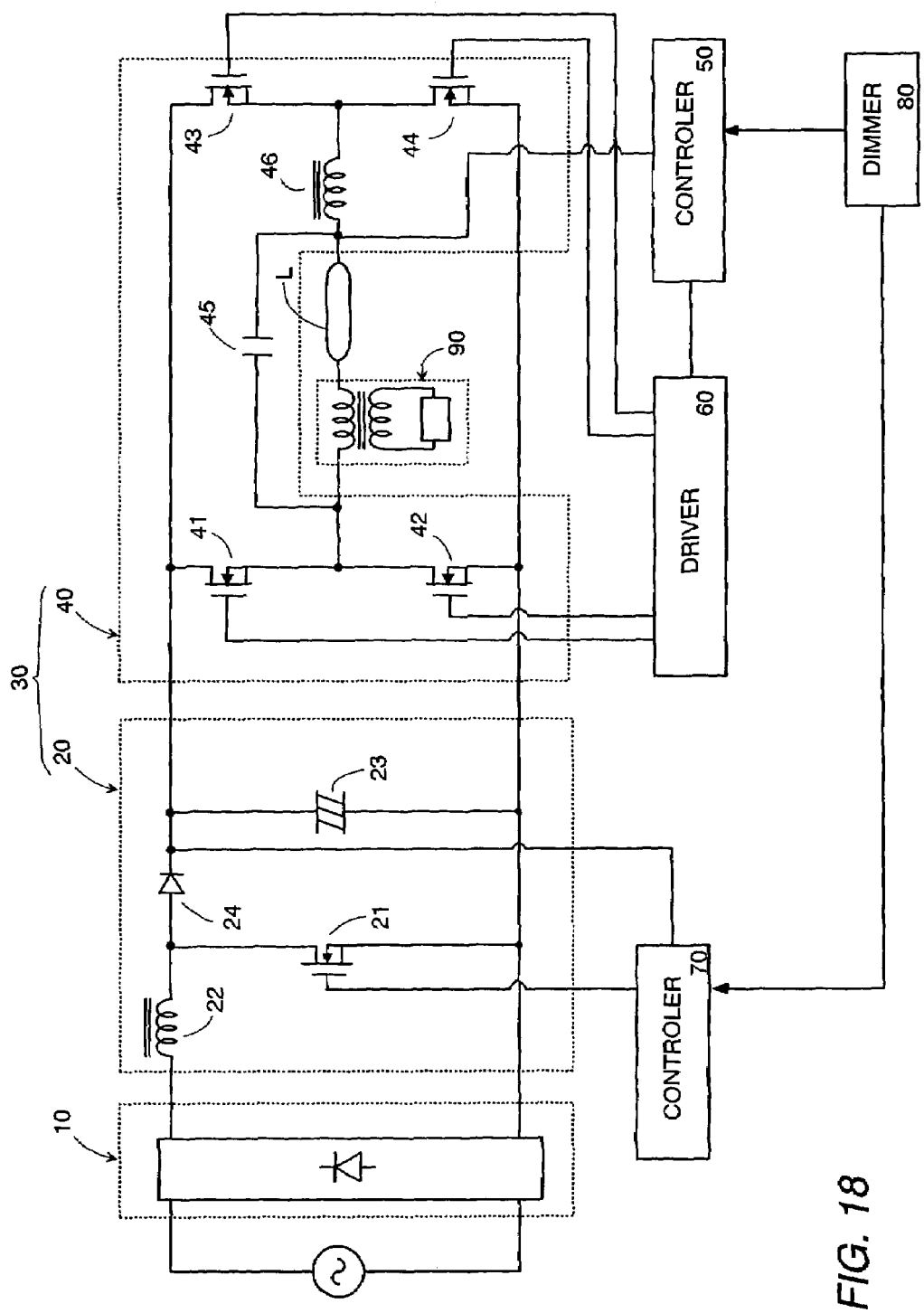
FIG. 18 is a circuit diagram of an electronic ballast in accordance with a fifth embodiment of the present invention.
Figure 19:
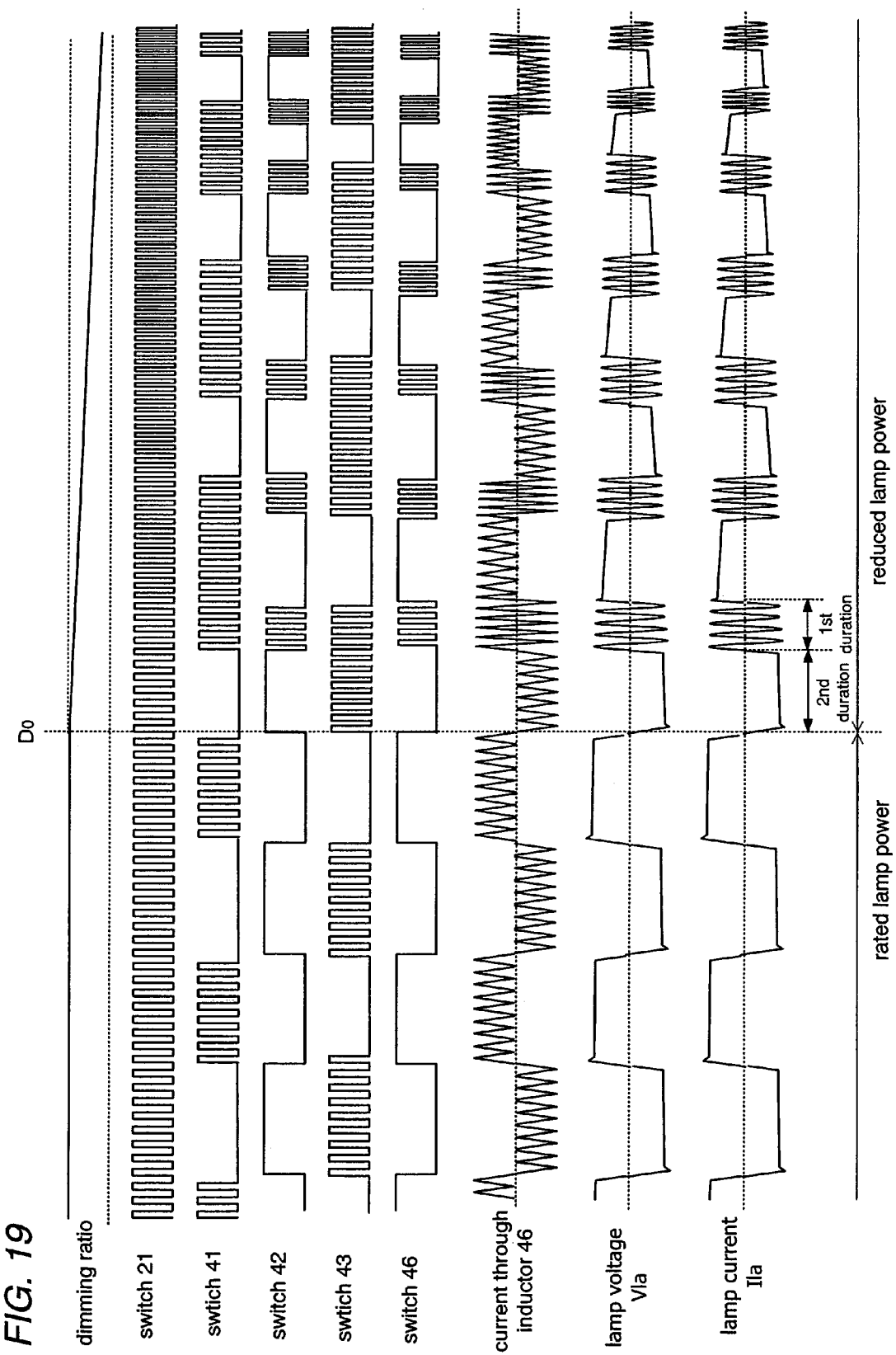
FIG. 19 is a waveform chart illustrating the operation of the above ballast.

Fifth Embodiment <FIGS. 18 and 19>

FIGS. 18 and 19 show an electronic ballast and its operation in accordance with a fifth embodiment of the present invention which is basically identical to the fourth embodiment except that the high frequency drive and the low frequency drive are utilized to alternate with each other when reducing the lamp power. While the lamp is operated at its rated lamp power, i.e., the dimming ratio is kept at 100%, the controller 50 controls the inverter 40 to provide the low frequency rectangular waveform AC voltage to the lamp. Upon seeing the dimming ratio lowering from 100% at $D_0$, the controller 50 controls the switches 41 to 44 in a manner as shown in FIG. 19, such that the low frequency AC voltage alternates the high frequency AC voltage. That is, the high frequency voltage is applied for a first duration immediately subsequent to a second duration during which the low frequency voltage is applied. As the dimming ratio decreases, the controller 70 operates to lower the DC voltage supplied from the DC supply 20 to the inverter 40, and at the same time, the controller 50 causes the inverter 40 to increase the frequencies of the low and high frequency AC voltages being supplied to the lamp, while keeping a ratio of the first duration to the second duration at a constant. Whereby, the RMS value of the current being supplied to the lamp can be reduced with the decreasing dimming ratio for effectively dimming the lamp. With this control scheme of adding the low frequency current to the high frequency current when dimming the lamp, it is readily possible to minimize the switching loss due to the high frequency drive, yet making the use of the high frequency drive for expanding the dimming range without suffering from the undesired color temperature deviation. Also, this control scheme is effective for avoiding the acoustic resonance.

Figure 20:
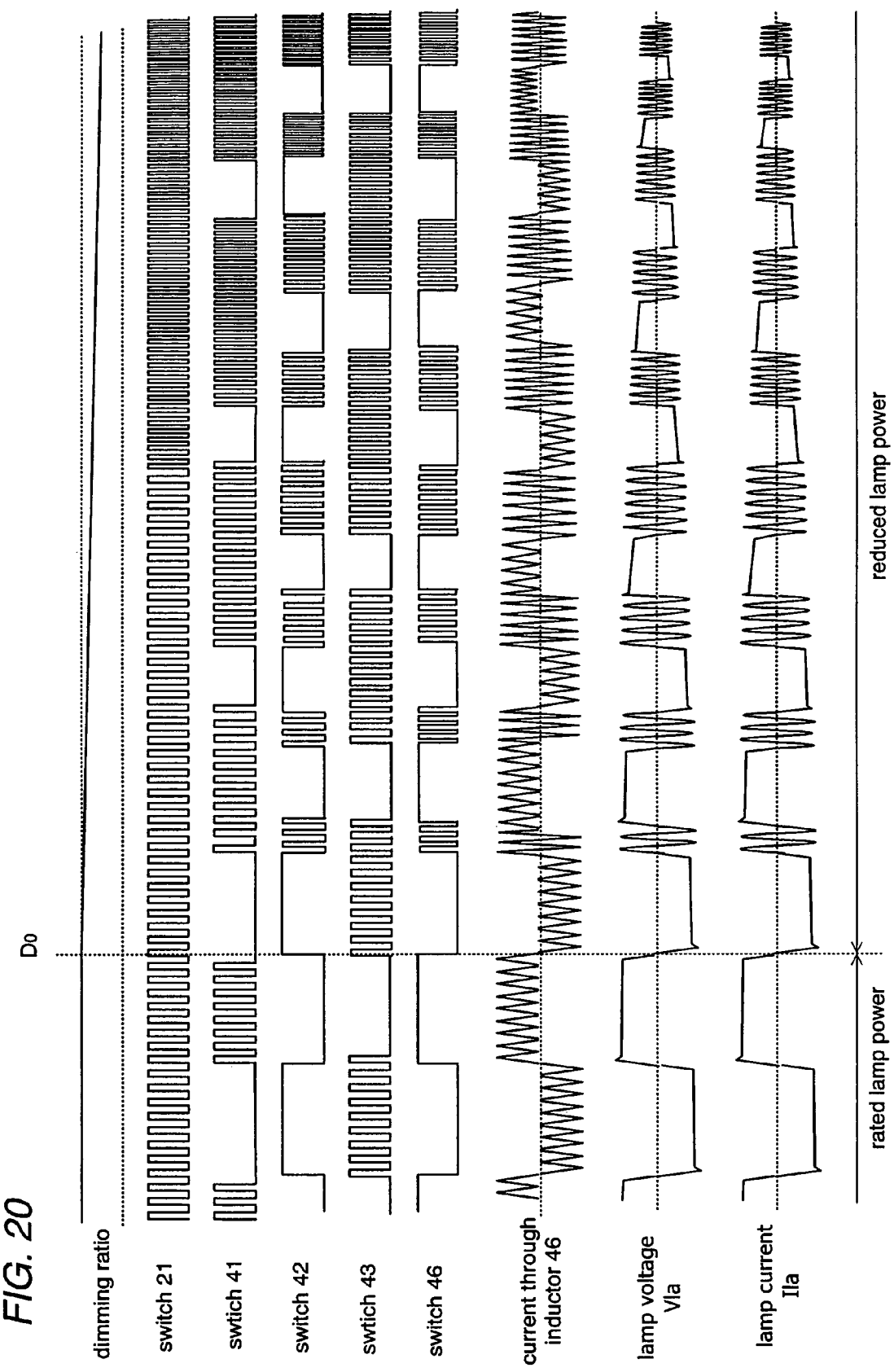
FIG. 20 is a waveform chart illustrating the operation of an electronic ballast in accordance with a modification of the fifth embodiment.
Figure 21:
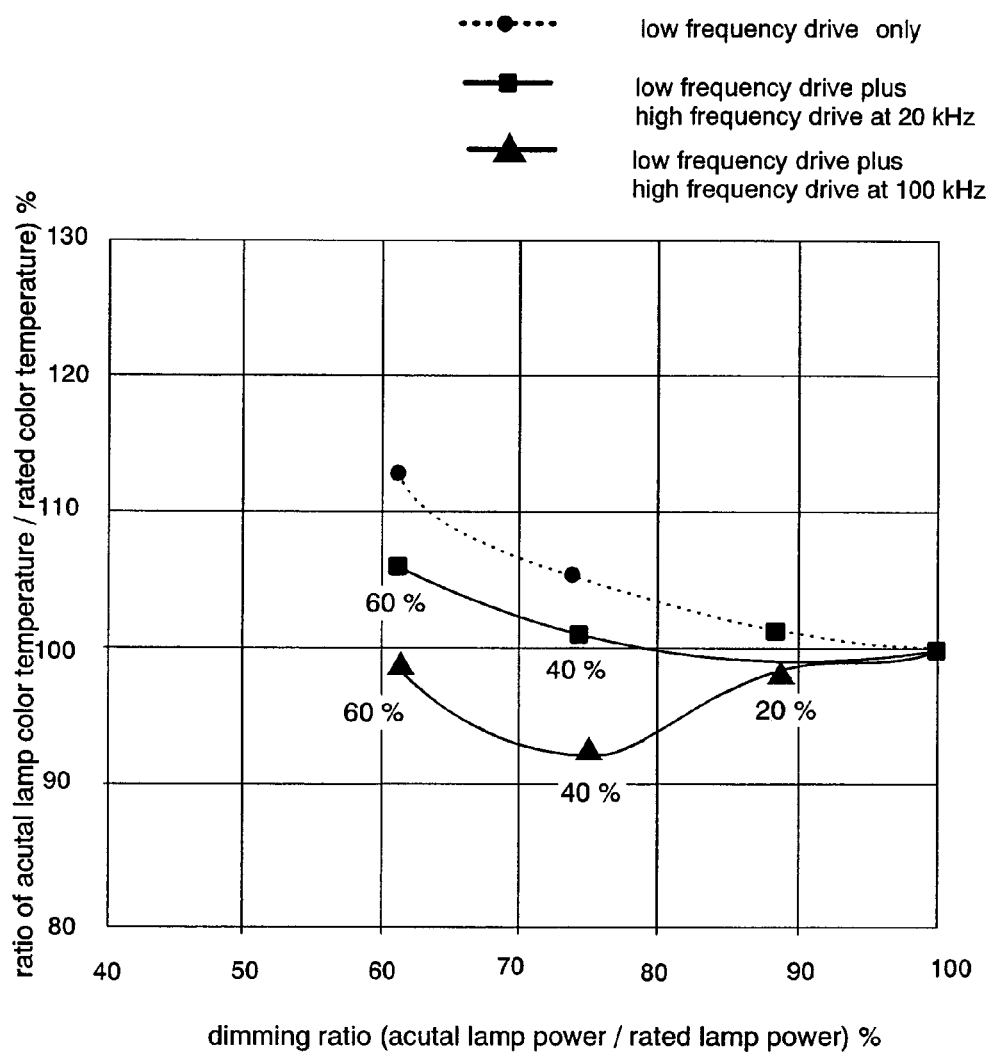
FIG. 21 a graph illustrating the operation of the above modification.

FIG. 20 shows a waveform chart with regard to an electronic ballast in accordance with a first modification of the fifth embodiment. The ballast is basically identical to the fifth embodiment and is further arranged to increase a duration time ratio of the first duration to the second duration, in addition to increasing the frequency, as the dimming ratio decreases from 100% at $D_0$. That is, the high frequency drive takes a greater proportion relative to the low frequency drive as the lamp power is lowered. This is particularly advantageous for minimizing the color temperature deviation while enabling the lamp to be dimmed to a large extent, as confirmed from test results shown in FIG. 21 where color temperature variation (ratio of actual color temperature to the rated color temperature) are plotted against the varying dimming ratio for the above combination control with varying duration time periods, namely, 20%, 40%, and 60%, respectively at the high frequencies of 20 kHz and 100 kHz. As is clear from FIG. 21, the dimming at about 60% can be made only with less color temperature change when using the high frequency of 100 kHz (indicated by triangular dots) than using 20 kHz (indicated by square dots), and of course when using the low frequency drive (indicated by circular dots). Further, it is found from FIG. 21 that the color temperature variation of about 100% can be kept over the dimming ratio from 100% to 60% by a suitable combination of the varying frequency and varying duration time period, resulting in a relatively straight line. In other words, there exists the suitable combination of the varying frequency and the duration time periods that result in the approximately straight line plotted in FIG. 21 at least over the dimming ratio of 100% to 60%.

Figure 22:
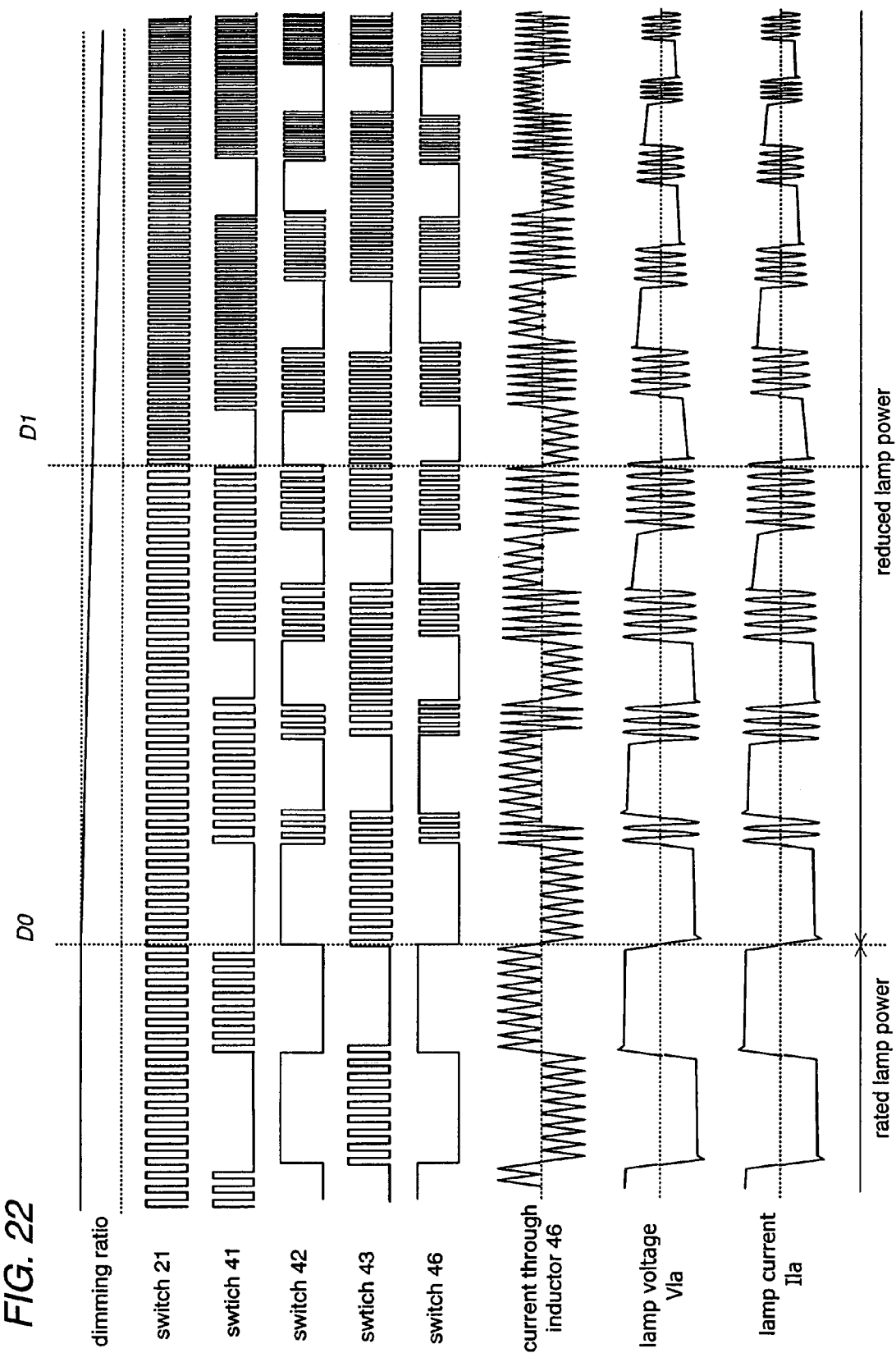
FIG. 22 is a waveform chart illustrating the operation of an electronic ballast in accordance with another modification of the fifth embodiment.

Although it is illustrated in FIG. 20 to increase the frequency as well as the duration time ratio of the high frequency drive to the low frequency drive immediately after the dimmer ratio decreases from 100% at $D_0$, it is equally possible to start this control only after the dimming ratio decreases past a predetermined level and to maintain one of the frequency and the duration time ratio at a constant value while the dimming ratio decreases from 100% to the predetermined level. FIG. 22 shows one modification of the fourth embodiment in which the duration time ratio is controlled to increase with the frequency being fixed until the dimming ratio decreases to the level D1 from 100% at $D_0$. After the dimming ratio decreases past level $D_1$, both of the frequency and the duration time ratio are controlled to increase with the decreasing dimming ratio. The duration time ratio may start from 0% or more at the dimming ratio decreasing from 100% at $D_0$.

Figure 23:
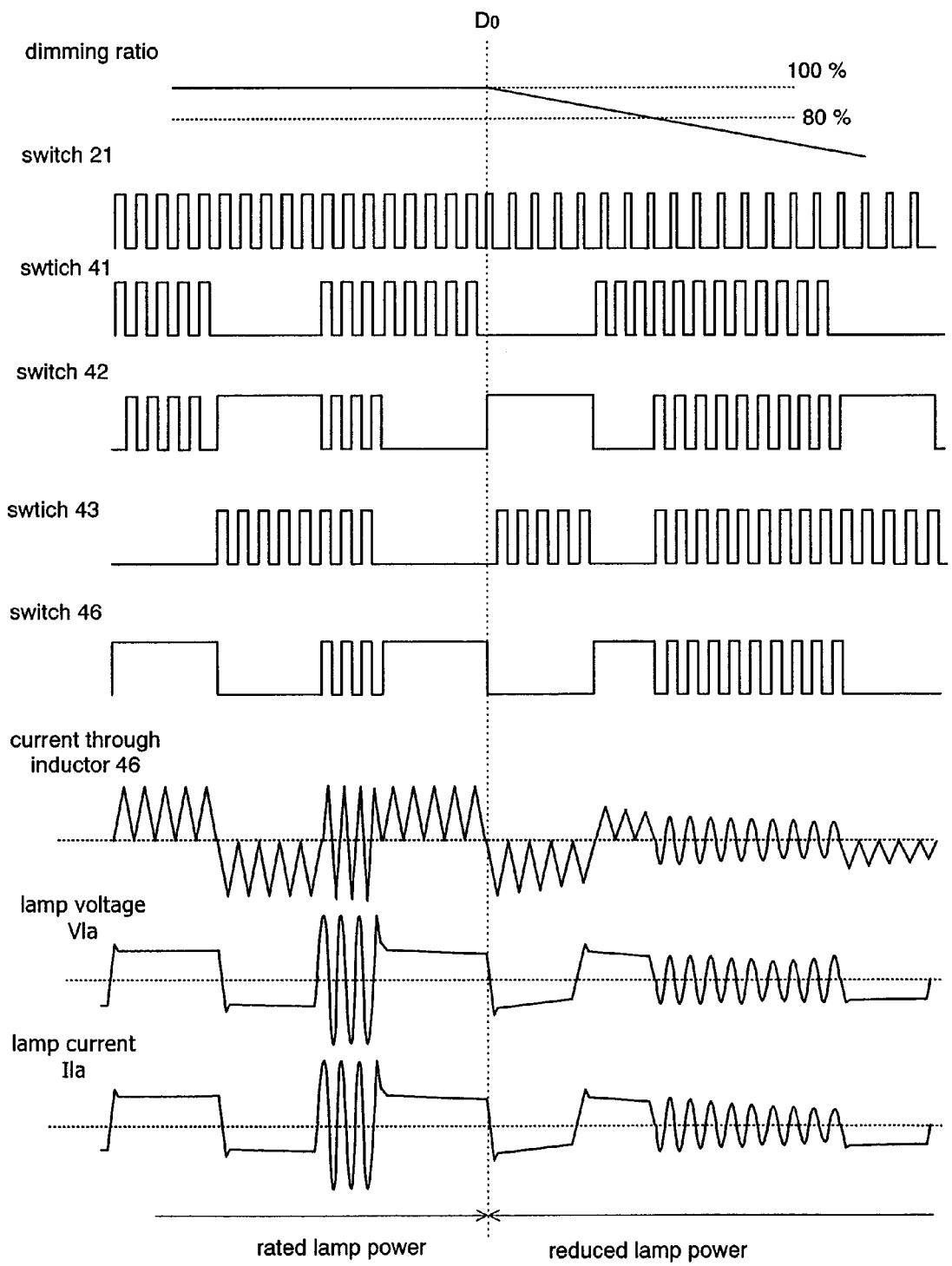
FIG. 23 is a waveform chart illustrating the operation of an electronic ballast in accordance with a further modification of the fifth embodiment.
Figure 24:
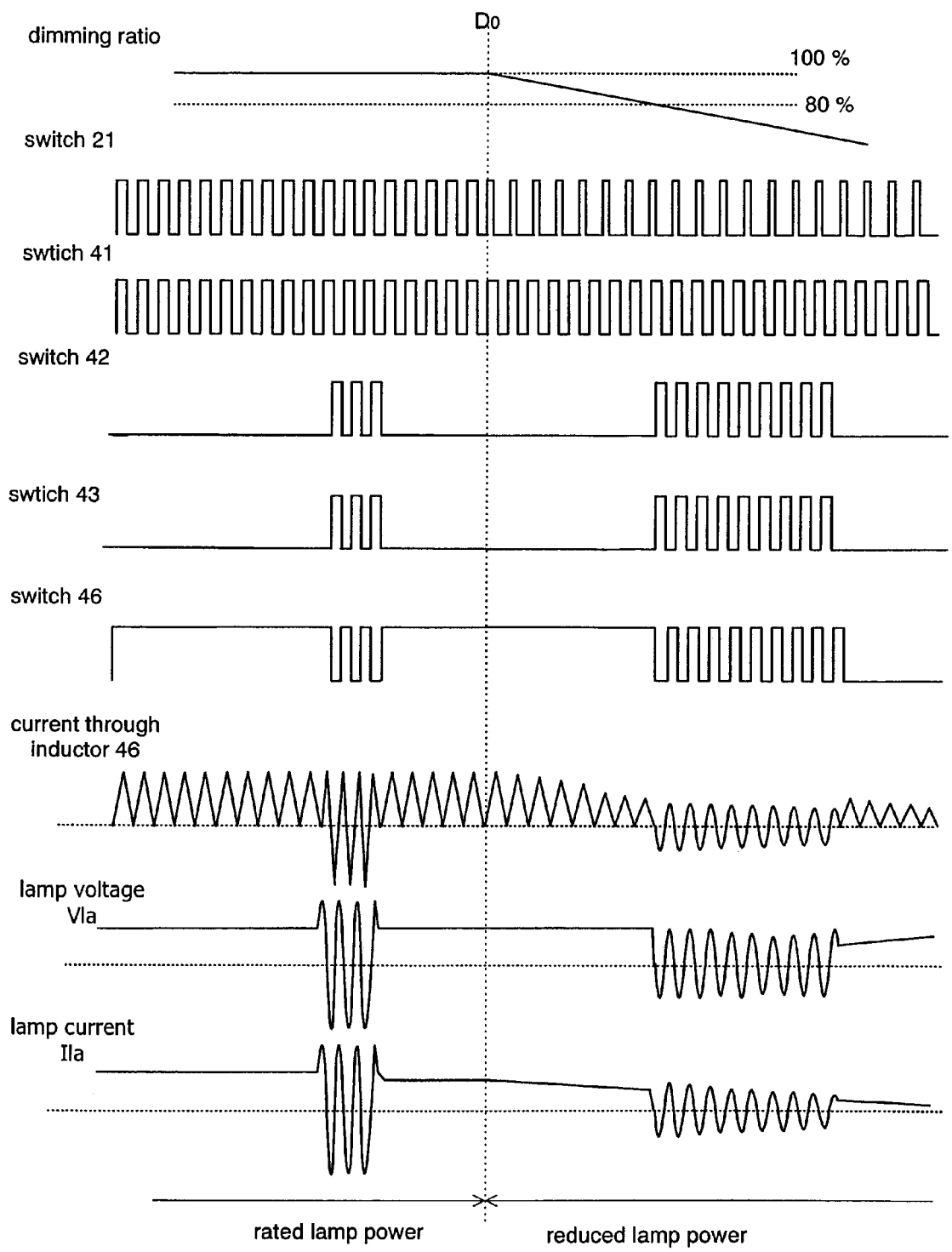
FIG. 24 is a waveform chart illustrating the operation of an electronic ballast in accordance with a still further modification of the fifth embodiment.

Further, the above combination of the low frequency drive and low frequency drive can be introduced also for operating the lamp at the rated lamp power, as shown in FIG. 23. Further, instead of using the low frequency drive, it is equally possible to combine a DC current drive with the high frequency drive throughout or over a limited dimming range, as shown in FIG. 24. In the modification of FIG. 24, the inverter acts partly as a step-down chopper for providing a step-down DC voltage while switch 46 is on over a relatively long period for providing a suitable DC lamp voltage Vla. Further, it is possible to make only the DC drive when operating the lamp at the rated lamp power and to add the high frequency AC drive to an increasing extent as the dimming ratio decreases.

The above particular embodiments and the modifications thereof are made only for the purpose of describing the essence of the present invention and not limiting the present invention thereto. Therefore, the present invention can encompass any combination of the individual features of the embodiment and the modifications.

This application is based upon and claims the priority of Japanese Patent Application No. 2001-157565 filed in Japan on May 25, 2001, No. 2001-365077 filed in Japan on Nov. 29, 2001, and No. 2002-018854 filed in Japan on Jan. 28, 2002, the entire contents of which are expressly incorporated by reference herein.

The invention claimed is:

1. An electronic ballast for a high intensity discharge lamp comprising:
    a power converter which converts an input DC voltage into a lamp power for driving the high intensity discharge lamp;
    a dimmer which provides a dimmer command of a varying dimming ratio in order to reduce the lamp power for dimming the lamp to a greater extent as the dimming ratio decreases; and
    a controller which receives said dimmer command and controls said power converter to lower said lamp power as said dimmer command decreases the dimming ratio;
    wherein said controller controls said power converter to supply a high frequency AC current to said discharge lamp in response to said dimming ratio decreasing to a predetermined level; said controller controlling to reduce an RMS value of said high frequency AC current as said dimming ratio decreases past predetermined level.

2. The electronic ballast as set forth in claim 1, wherein said power converter includes a DC supply which provides a variably regulated DC voltage from said input DC voltage, and an inverter which converts said regulated DC voltage into said high frequency AC current being supplied to the discharge lamp, said controller controlling said DC supply to lower said regulated DC voltage in order to lower the RMS value of said high frequency AC current as said dimming ratio is lowered.

3. The electronic ballast as set forth in claim 1, wherein said controller controls said power converter to supply the high frequency AC current also when said dimming ratio is 100%.

4. The electronic ballast as set forth in claim 1, further including
    a sensor which monitors a color temperature of said discharge lamp, and a limiter which includes a memory for storing a rated color temperature of the discharge lamp operating at its rated lamp power, and
    a predetermined admissible color temperature difference,
    said limiter operating to compare an instant color temperature of the discharge lamp being dimmed with said rated color temperature, and providing a limit signal to said controller when the instant color temperature becomes deviated from said rated color temperature by an extent greater than said admissible color temperature difference,
    said controller operating to limit a further lowering of the lamp power upon seeing said limit signal.

5. The electronic ballast as set forth in claim 4, wherein said limiter includes a setting means for variably setting said admissible color temperature difference.

6. The electronic ballast as set forth in claim 1, wherein said controller controls said power converter to increase a frequency of said high frequency AC current supplied to said discharge lamp as said dimming ratio decreases.

7. The electronic ballast as set forth in claim 1, wherein said controller controls said power converter to supply one of a low frequency rectangular waveform AC current and a DC current when the dimming ratio is 100%.

8. The electronic ballast as set forth in claim 7, wherein said controller controls said power converter to generate said low frequency rectangular waveform AC current being supplied to the discharge lamp and to decrease an amplitude of said low frequency rectangular waveform AC current as said dimming ratio decreases down to said predetermined level, said controller controlling said power converter to supply said high frequency AC current, in response to said dimming ratio decreasing past said predetermined level.

9. The electronic ballast as set forth in claim 7, wherein said controller controls said power converter to generate the low frequency rectangular waveform AC current and the high frequency AC current which are selectively supplied to the discharge lamp,
    said ballast including a sensor which monitors a color temperature of the discharge lamp, and a selector which includes a memory for storing a rated color temperature of the discharge lamp operating at its full lamp power as well as a predetermined admissible color temperature difference,
    said selector operating to compare an instant color temperature of the discharge lamp being dimmed with said rated color temperature, and providing a switchover signal when the instant color temperature becomes deviated from said rated color temperature by an extent greater than said admissible color temperature difference,
    said controller controlling said power converter to generate the low frequency rectangular waveform AC current being supplied to the discharge lamp when the dimmer ratio is 100%, and to decrease the amplitude of the lower frequency rectangular waveform AC current as the dimming ratio decreases in the absence of said switchover signal,
    said controller controlling said power converter to generate the high frequency AC current upon seeing said switchover signal and to reduce the RMS current of the high frequency AC current as said dimming ratio decreases.

10. The electronic ballast as set forth in claim 9, wherein said selector includes a setting means for variably setting said admissible color temperature difference.

11. The electronic ballast as set forth in claim 1, wherein said controller, in response to said dimmer command, controls said power converter to supply a low frequency rectangular waveform AC current which alternates said high frequency AC current, said controller controlling said power converter to increase, as said dimming ratio decreases, a duration time ratio of a first duration in which the high frequency AC current is supplied to the discharge lamp to a second duration in which said low frequency rectangular waveform AC current is supplied to the discharge lamp.

12. The electronic ballast as set forth in claim 1, wherein said controller, in response to said dimmer command, controls said power converter to generate a DC current which alternates said high frequency AC current, said controller controlling said power converter to increase, as said dimming ratio decreases, a duration time ratio of a first duration in which the high frequency AC current is supplied to the discharge lamp to a second duration in which said DC current is supplied to the discharge lamp.

13. The electronic ballast as set forth in claim 11, wherein said controller controls said power converter to increase the frequency of the high frequency AC current as said dimming ratio decreases.

14. The electronic ballast as set forth in claim 11, wherein said controller controls to said power converter to keep generating the high frequency AC current of a fixed frequency until said dimming ratio lowers to a predetermine value and to generate the high frequency AC current of which frequency increases with the lowering of the dimming ratio past said predetermined value.

15. The electronic ballast as set forth in claim 1, wherein said controller controlling said power converter to supply the high frequency AC current having a crest factor of 1.4 or greater.

16. The electronic ballast as set forth in claim 1, wherein said controller controls said power converter to supply said high frequency AC current having a frequency higher than a critical level below which an acoustic resonance occurs.

17. The electronic ballast as set forth in claim 1, wherein said high frequency AC current has a frequency of several tens of kHz to several hundreds of kHz.

18. The electronic ballast as set forth in claim 7, wherein said low frequency rectangular waveform AC current has a frequency of several tens of Hz to several hundreds of Hz.

19. The electronic ballast as set forth in claim 11, wherein said low frequency rectangular waveform AC current has a frequency of several tens of Hz to several hundreds of Hz.

20. The electronic ballast as set forth in claim 1, wherein said high intensity discharge lamp has a transparent tube filled with a mixture of mercury and metal halides comprising at least sodium halide.

* * * * *